US008428801B1

(12) United States Patent
Nose et al.

(10) Patent No.: US 8,428,801 B1
(45) Date of Patent: Apr. 23, 2013

(54) MARINE VESSEL PROPULSION SYSTEM AND MARINE VESSEL INCLUDING THE SAME

(75) Inventors: Yukinori Nose, Shizuoka (JP); Toshiya Inai, Shizuoka (JP); Yoshiyuki Ichikawa, Shizuoka (JP); Makoto Mizutani, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/442,895

(22) Filed: Apr. 10, 2012

Related U.S. Application Data

(62) Division of application No. 12/693,690, filed on Jan. 26, 2010, now Pat. No. 8,234,024.

(30) Foreign Application Priority Data

Jan. 27, 2009 (JP) .................................. 2009-014988

(51) Int. Cl.
*B63H 25/00* (2006.01)
*B63H 25/42* (2006.01)

(52) U.S. Cl.
USPC .......................... 701/21; 114/144 RE; 440/53

(58) Field of Classification Search .............. 114/144 R, 114/144 RE; 440/53; 701/21
See application file for complete search history.

(56) References Cited

U.S. PATENT DOCUMENTS

| | | | | |
|---|---|---|---|---|
| 5,031,561 A * | 7/1991 | Nilsson | ....................... | 114/144 R |
| 6,234,853 B1 * | 5/2001 | Lanyi et al. | ...................... | 440/53 |
| 6,994,046 B2 * | 2/2006 | Kaji et al. | ................. | 114/144 R |
| 7,121,908 B2 * | 10/2006 | Okuyama | ........................ | 440/84 |
| 7,325,505 B2 * | 2/2008 | Otobe et al. | .............. | 114/144 R |
| 7,455,557 B2 * | 11/2008 | Mizutani | ........................... | 440/1 |
| 8,170,735 B2 * | 5/2012 | Kaji | ................................ | 701/21 |
| 2005/0092225 A1 * | 5/2005 | Kaji et al. | ................. | 114/144 R |
| 2007/0017426 A1 * | 1/2007 | Kaji et al. | ............... | 114/144 RE |
| 2007/0055419 A1 * | 3/2007 | List et al. | ......................... | 701/21 |
| 2007/0093147 A1 * | 4/2007 | Mizutani | ............................ | 440/1 |
| 2008/0171479 A1 * | 7/2008 | Hallenstvedt et al. | ............ | 440/1 |
| 2010/0145558 A1 * | 6/2010 | Kaji | ................................ | 701/21 |
| 2010/0191396 A1 * | 7/2010 | Nose et al. | ..................... | 701/21 |
| 2011/0166724 A1 * | 7/2011 | Hiramatsu | ..................... | 701/21 |

OTHER PUBLICATIONS

Nose et al.; "Marine Vessel Propulsion System and Marine Vessel Including the Same"; U.S. Appl. No. 12/693,690, filed Jan. 26, 2010.

* cited by examiner

*Primary Examiner* — Ruth Ilan
(74) *Attorney, Agent, or Firm* — Keating & Bennett, LLP

(57) ABSTRACT

A marine vessel propulsion system includes first and second propulsion devices, a first operation lever arranged to be operated by a marine vessel maneuvering operator to control the first propulsion device, a second operation lever arranged to be operated by the marine vessel maneuvering operator to control the second propulsion device, a first lever position sensor arranged to detect a position of the first operation lever, a second lever position sensor arranged to detect a position of the second operation lever, and a control unit. The control unit is programmed to set a target pivoting speed according to the positions of the first and second operation levers relative to each other and set a target travel speed according to amounts of displacement of the first and second operation levers with respect to neutral positions.

9 Claims, 20 Drawing Sheets

FIG. 22

| OPERATION LEVER POSITION | | STEERING ANGLE (DEGREE) | | SHIFT STATE | |
|---|---|---|---|---|---|
| LEFT | RIGHT | LEFT | RIGHT | LEFT | RIGHT |
| NEUTRAL | NEUTRAL | 0 | 0 | N | N |
| (A2) NEUTRAL | FORWARD DRIVE | -10 | +10 | F | R |
| (B2) NEUTRAL | REVERSE DRIVE | -10 | +10 | F | R |
| | | | | | |
| (A1) FORWARD DRIVE | NEUTRAL | -10 | +10 | R | F |
| FORWARD DRIVE | FORWARD DRIVE | 0 | 0 | F | F |
| (C1) FORWARD DRIVE | REVERSE DRIVE | +10 | -10 | F | R |
| | | | | | |
| (B1) REVERSE DRIVE | NEUTRAL | -10 | +10 | R | F |
| (C2) REVERSE DRIVE | FORWARD DRIVE | +10 | -10 | R | F |
| REVERSE DRIVE | REVERSE DRIVE | 0 | 0 | R | R |

MARINE VESSEL PROPULSION SYSTEM AND MARINE VESSEL INCLUDING THE SAME

BACKGROUND OF THE INVENTION

1. Field of the Invention

The present invention relates to a marine vessel propulsion system including operation levers arranged to be operated for controlling the respective shift states of multiple propulsion devices. The present invention also relates to a marine vessel including such a system.

2. Description of the Related Art

There has been known a marine vessel propulsion system including operation levers arranged to be operated by a marine vessel maneuvering operator to control the respective shift states of multiple propulsion devices. One example of such a propulsion device is an outboard motor.

Such amarine vessel propulsion system includes, for example, two outboard motors mounted on a hull. The two outboard motors are coupled to each other with a tie bar and arranged to have substantially the same steering angle. The marine vessel propulsion system further includes two operation levers corresponding to the two respective outboard motors. The shift state and throttle opening degree of each outboard motor can be adjusted independently by operating the corresponding operation lever. In addition, the two outboard motors are steerable through one steering mechanism.

The thus arranged marine vessel propulsion system requires a complicated operation when finely controlling the movement of the marine vessel, such as when launching from and docking on shore. That is, the operator is required to finely control both the steering mechanism and the two operation levers.

The hull may include a side thruster (propulsion device for lateral movement) for easier marine vessel maneuvering when launching from and docking on shore. This, however, results in the marine vessel propulsion system having a complex structure, and is not suitable particularly for small marine vessels.

United States Patent Application Publication No. US 2007/0017426A1 discloses a marine vessel propulsion system that can finely control the movement of a marine vessel easily without providing a side thruster.

This marine vessel propulsion system includes two operation levers corresponding, respectively, to two outboard motors and a cross-shaped key provided separately from the two operation levers. The shift state and throttle opening degree of each outboard motor can be adjusted independently by operating the corresponding operation lever. In addition, the two outboard motors are steerable through one steering mechanism. This marine vessel propulsion system can set a marine vessel maneuvering support mode. In the marine vessel maneuvering support mode, operating the cross-shaped key causes the steering angle, shift state, and throttle opening degree of each outboard motor to be adjusted so that the hull moves in the direction indicated by the cross-shaped key. This allows the movement of the marine vessel to be controlled finely and easily without a side thruster.

SUMMARY OF THE INVENTION

The inventors of preferred embodiments of the present invention described and claimed in the present application conducted an extensive study and research regarding a marine vessel propulsion system, such as the one described above, and in doing so, discovered and first recognized new unique challenges and previously unrecognized possibilities for improvements as described in greater detail below.

That is, the related art above requires two operation levers and a cross-shaped key to be provided separately, resulting in the marine vessel propulsion system having a complex structure. That is, even though no side thruster is provided, an additional operation system defined by the cross-shaped key, must be provided in addition to the operation levers and the steering mechanism. This results in an overly complex structure and requires somewhat more complicated operations due to an increase in the number of operation systems.

In order to overcome the previously unrecognized and unsolved challenges described above, a preferred embodiment according to an aspect of the present invention provides a marine vessel propulsion system including first and second propulsion devices arranged to be mounted on a hull so as to enable a steering angle to change, a first operation lever arranged to be operated by a marine vessel maneuvering operator to control the first propulsion device to have a shift state selected from among a forward drive state, a neutral state, and a reverse drive state and to control a power output of the first propulsion device, a second operation lever arranged to be operated by the marine vessel maneuvering operator to control the second propulsion device to have a shift state selected from among a forward drive state, a neutral state, and a reverse drive state and to control a power output of the second propulsion device, a first lever position sensor arranged to detect a position of the first operation lever, a second lever position sensor arranged to detect a position of the second operation lever, and a control unit. The control unit is programmed to set, based on detection results from the first and second lever position sensors, a target pivoting speed according to the positions of the first and second operation levers relative to each other and to set a target travel speed according to amounts of displacement of the first and second operation levers with respect to neutral positions. The control unit is further programmed to control the steering angles, shift states, and propulsive forces of the respective first and second propulsion devices such that the hull pivots at the target pivoting speed and travels at the target travel speed.

In the thus arranged marine vessel propulsion system, the target pivoting speed and target travel speed of the hull are set based on the positions of the first and second operation levers. The steering angles, shift states, and propulsive forces of the first and second propulsion devices are then controlled according to the set target pivoting speed and target travel speed. That is, not only the shift states and propulsive forces but also the steering angles follow the positions of the first and second operation levers. This arrangement allows the propulsive forces of the propulsion devices to be used effectively when the hull pivots or turns (pivots while moving forward or backward). This allows the behavior of the hull to be changed quickly and highly responsively. As a result, the movement of the marine vessel can be finely controlled.

In addition, since the marine vessel can be controlled by only operating the operation levers, there is no need to operate a steering operation mechanism such as a steering mechanism. It is therefore possible to improve the operability when finely controlling the movement of the marine vessel. There is also no need to provide another operation system, such as a cross-shaped key, separately from the operation levers, which can prevent the marine vessel propulsion system from having a complex structure. Since there is no need to add another operation system, no complicated operations are required.

In a preferred embodiment of the present invention, the control unit is programmed to set the target pivoting speed according to a difference between the positions of the first and second operation levers detected by the first and second lever position sensors. This arrangement allows the operator to set the target pivoting speed through an intuitive operation.

Also, in a preferred embodiment of the present invention, the control unit is programmed to set the target travel speed according to the position of one of the first and second operation levers having a smaller amount of displacement with respect to the neutral position thereof. This arrangement allows the operator to set the target travel speed through an intuitive operation.

In a preferred embodiment of the present invention, the control unit is programmed to set the target travel speed to zero when the first operation lever is on one side with respect to the neutral position thereof and the second operation lever is on the other side with respect to the neutral position thereof. This arrangement allows the operator to easily perform marine vessel maneuvering by which the hull pivots without substantially moving forward or backward.

In a preferred embodiment of the present invention, the first and second operation levers are arranged laterally, the first operation lever being arranged on the right and arranged to be operated back and forth, while the second operation lever being arranged on the left and arranged to be operated back and forth, and the control unit is programmed to set the target pivoting speed such that the hull pivots counterclockwise when the first operation lever is positioned anterior to the second operation lever, while the hull pivots clockwise when the first operation lever is positioned posterior to the second operation lever. With this arrangement, the positions of the first and second operation levers correspond to the pivoting direction and the pivoting speed, which allows the hull to pivot through a more intuitive operation.

In a preferred embodiment of the present invention, the control unit is programmed to control each propulsion device to have a constant power output (e.g., minimum power output) when a moment (e.g., greater than zero) applied by each propulsion device to the hull is equal to or smaller than a predetermined threshold value, and to control the steering angle of each propulsion device according to the applied moment. This arrangement causes the moment to be adjusted depending on the change in the steering angle, which requires a smaller amount of energy than in the case of increasing the power output of each propulsion device.

In the case above, the control unit is preferably programmed to control each propulsion device to have a maximum steering angle when the moment applied by each propulsion device to the hull is larger than the predetermined threshold value, and to control each propulsion device to have a power output according to the moment. This arrangement allows a large moment that cannot be generated by only controlling the steering angle to be generated by controlling the propulsive force. In addition, since the moment is adjusted by controlling the steering angle until the steering angle of each propulsion device reaches the maximum steering angle, the energy consumption by the propulsion device can be reduced.

In a preferred embodiment of the present invention, the control unit is programmed to set the steering angle of one of the first and second propulsion devices such that the direction of the propulsive force of the one propulsion device follows a straight line that passes through the rotational center of the hull and to set the steering angle, shift state, and propulsive force of the other of the first and second propulsion devices according to the target pivoting speed. With this arrangement, the propulsive force of the one propulsion device applies a very small moment to the hull and therefore hardly contributes to the pivoting of the hull. It is therefore only required to set the steering angle, shift state, and propulsive force of the other propulsion device according to the target pivoting speed, which facilitates the control operation for achieving the target pivoting speed.

In the case above, the control unit is preferably programmed to set the shift state and propulsive force of the one propulsion device according to an anteroposterior component of the propulsive force of the other propulsion device and the target travel speed. It should be noted that the anteroposterior component is a component of the propulsive force generated by the selected outboard motor in the longitudinal direction of the hull. With this arrangement, the effect of the anteroposterior component of the propulsive force of the other propulsion device that applies a moment to the hull can be eliminated by the propulsive force of the one propulsion device. This allows for achieving both the target pivoting speed and target travel speed. When the target travel speed is zero, for example, the entire anteroposterior component of the propulsive force of the other propulsion device is canceled by the propulsive force of the one propulsion device.

A preferred embodiment of the present invention further includes, a steering operation mechanism arranged to be operated by the marine vessel maneuvering operator to change the steering angles of the first and second propulsion devices, an operation angle sensor arranged to detect an operation angle of the steering operation mechanism, and a switching unit arranged to switch between normal marine vessel maneuvering control and assisted marine vessel maneuvering control. In this case, in the normal marine vessel maneuvering control, the control unit is preferably programmed to control the shift states and propulsive forces of the first and second propulsion devices based on detection results from the first and second lever position sensors, and to change the steering angles of the first and second propulsion devices based on a detection result from the operation angle sensor. Further, in the assisted marine vessel maneuvering control, the control unit is preferably programmed to set, based on detection results from the first and second lever position sensors, a target pivoting speed according to the positions of the first and second operation levers relative to each other and set a target travel speed according to the amounts of displacement of the first and second operation levers with respect to the neutral positions, and to control the steering angles, shift states, and propulsive forces of the respective first and second propulsion devices such that the hull pivots at the target pivoting speed and travels at the target travel speed. This arrangement allows for switching between the normal marine vessel maneuvering control and the assisted marine vessel maneuvering control. In the normal marine vessel maneuvering control, the operator can use the steering operation mechanism for steering. When it is required to finely control the movement of the marine vessel (such as when launching from and docking on shore), the operator can use only the operation levers for steering by switching to the assisted marine vessel maneuvering control.

In the assisted marine vessel maneuvering control, the control unit may be programmed to control each of the first and second propulsion devices to have a propulsive force smaller than that corresponding to the position of each of the first and second operation levers in the normal marine vessel maneuvering control.

In a preferred embodiment of the present invention, the first propulsion device includes a first outboard motor arranged to be mounted on the hull so as to enable the steering angle to change, and the second propulsion device includes a second outboard motor arranged to be mounted on the hull so as to enable the steering angle to change. Each of the first and second outboard motors includes, for example, an engine with a driving force thereof being adjustable through control of throttle opening degree, a propeller arranged to be rotated by a driving force from the engine, and a switching mechanism portion arranged to switch shift states. In this case, the first and second operation levers are preferably arranged to be operated by the marine vessel maneuvering operator to control the first and second outboard motors to be their respective shift states and throttle opening degrees. The control unit is preferably programmed to control the steering angles, shift states, and throttle opening degrees of the respective first and second outboard motors based on detection results from the first and second lever position sensors. With this arrangement, the marine vessel propulsion system including outboard motors can improve the operability when finely controlling the movement of the marine vessel.

A preferred embodiment according to another aspect of the present invention includes multiple propulsion devices arranged to be mounted on a hull so as to enable a steering angle to change, multiple operation levers, multiple lever position sensors, a storage unit, and a control unit. The multiple operation levers are arranged to be operated by a marine vessel maneuvering operator to control the multiple propulsion devices to have respective shift states selected from among a forward drive state, a neutral state, and a reverse drive state. The lever position sensors are provided correspondingly to the respective multiple operation levers and arranged to detect positions of the operation levers. The storage unit is arranged to store therein behavior patterns of the hull preset correspondingly to positional relationships between the multiple operation levers. The control unit is programmed to select among the behavior patterns based on detection results from the multiple lever position sensors, and to control the steering angles and shift states of the respective multiple propulsion devices to correspond to the selected behavior pattern. The behavior patterns of the hull may be stored in a form of configuration information for realizing the behavior patterns. Such configuration information includes, for example, target values of the steering angles and shift states of multiple propulsion devices.

In the thus arranged marine vessel propulsion system, selection is made among the behavior patterns of the hull based on detection results from the multiple lever position sensors. The steering angles and shift states of the respective multiple propulsion devices are then controlled to correspond to the selected behavior pattern. That is, not only the shift states but also the steering angles follow the detection results from the lever position sensors. The behavior patterns of the hull include, for example, pivoting and lateral movement. If the operator wants the hull to behave a certain way, the operator operates multiple operation levers so as to have a positional relationship corresponding to the desired behavior. This allows the steering angles and shift states of the propulsion devices to be controlled automatically to be appropriate to achieve the desired hull behavior. This arrangement allows the propulsive forces of the propulsion devices to be used effectively when the hull pivots or moves laterally, for example. This allows the behavior of the hull to be changed quickly and highly responsively. As a result, the movement of the marine vessel can be finely controlled.

In addition, since the marine vessel can be controlled only by operating the operation levers, there is no need to operate a steering operation system such as a steering mechanism. It is therefore possible to improve the operability when finely controlling the movement of the marine vessel. There is also no need to provide another operation system such as a cross-shaped key separately from the operation levers, which can prevent the marine vessel propulsion system from having a complex structure. Since there is no need to add another operation system, no complicated operations are required.

In a preferred embodiment of the present invention, the multiple propulsion devices include a first propulsion device and a second propulsion device which is different from the first propulsion device. The multiple operation levers also include a first operation lever corresponding to the first propulsion device and a second operation lever corresponding to the second propulsion device. The control unit is programmed to select among behavior patterns preset correspondingly to the positional relationships between the first and second operation levers when a position of the first operation lever is different from a position of the second operation lever, and to control the steering angles and shift states of the respective first and second propulsion devices to correspond to the selected behavior pattern. For example, when the position of the first operation lever is different from the position of the second operation lever, the hull may exhibit a behavior other than straight travel, such as pivoting or lateral movement. In this case, the hull moves straight ahead when the first and second operation levers are in the same position, while exhibiting a behavior other than straight movement when the first and second operation levers are in their respective different positions. Since this behavior is similar to a behavior of the hull through a normal operation of the operation levers, it is possible to prevent the operator from having an unnatural feeling.

In a preferred embodiment of the present invention, the first and second operation levers are arranged laterally. The control unit is then programmed to control the steering angles, shift states of the respective first and second propulsion devices, when the position of the first operation lever is different from the position of the second operation lever, such that the hull moves in a direction corresponding to a direction from the position of the first operation lever to the position of the second operation lever. The operator may operate the first and second operation levers to orient the direction of a line segment between the levers to a direction in which he/she wants to move the hull. This allows the hull to be moved in that direction and thereby the marine vessel to be controlled easily.

In the case above, the control unit is preferably programmed to control the steering angles, shift states, and propulsive forces of the respective first and second propulsion devices, when the first operation lever is in the neutral position and the second operation lever is in a position other than the neutral position, such that the hull moves in a direction corresponding to a direction from the position of the first operation lever in the neutral position to the position of the second operation lever in the position other than the neutral position. For example, when the first operation lever is in the neutral position, the hull can move in the direction from the position of the first operation lever to the position of the second operation lever on the basis of the position of the first operation lever. Thus, using the neutral position as a basis for the movement direction of the hull allows the operator to set the movement direction of the hull easily.

The marine vessel propulsion system according to a preferred embodiment of the present invention further includes a steering operation mechanism arranged to be operated by the marine vessel maneuvering operator to change the steering angles of the respective multiple propulsion devices, an operation angle sensor arranged to detect an operation angle of the steering operation mechanism, and a switching unit arranged to switch between normal marine vessel maneuvering control and assisted marine vessel maneuvering control.

In this case, in the normal marine vessel maneuvering control, the control unit may preferably be programmed to control the shift states and propulsive forces of the propulsion devices based on detection results from the multiple lever position sensors, and to change the steering angles of the multiple propulsion devices based on a detection result from the operation angle sensor. Further, in the assisted marine vessel maneuvering control, the control unit may preferably be programmed to select among behavior patterns corresponding to the positional relationships between the multiple operation levers based on detection results from the multiple lever position sensors, and to control the steering angles and shift states of the respective multiple propulsion devices to correspond to the selected behavior pattern. This arrangement allows for switching between the normal marine vessel maneuvering control and the assisted marine vessel maneuvering control. In the normal marine vessel maneuvering control, the operator can use the steering operation mechanism for steering. When it is required to finely control the movement of the marine vessel (such as when launching from and docking on shore), the operator can use only the operation levers for steering by switching to the assisted marine vessel maneuvering control.

In the case above, in the assisted marine vessel maneuvering control, the control unit may preferably be programmed to control each of the propulsion devices to have a propulsive force smaller than that corresponding to the position of each operation lever in the normal marine vessel maneuvering control.

Also, in the assisted marine vessel maneuvering control, the control unit may preferably be programmed to select among behavior patterns preset correspondingly to the positional relationships between the multiple operation levers, based on detection results from the multiple lever position sensors and irrespective of the relationship between the positions of the operation levers and the shift states of the propulsion devices in the normal marine vessel maneuvering control, and to control the steering angles and shift states of the respective multiple propulsion devices to correspond to the selected behavior pattern. In the assisted marine vessel maneuvering control, the operator may operate the operation levers such that the levers are in a positional relationship corresponding to a behavior into which he/she wants to bring the hull without regard to the shift states of the propulsion devices. This allows the hull to perform the desired behavior easily.

Each of the propulsion devices preferably includes an outboard motor arranged to be mounted on the hull so as to enable the steering angle to change. The outboard motor includes, for example, an engine with a driving force thereof being adjustable through control of throttle opening degree, a propeller arranged to be rotated by a driving force from the engine, and a switching mechanism portion arranged to switch shift states. Also, the operation levers are preferably arranged to be operated by the marine vessel maneuvering operator to control the multiple outboard motors to be in their respective shift states and throttle opening degrees. Also, the control unit is preferably programmed to select among the behavior patterns based on detection results from the multiple lever position sensors, and to control the steering angles and shift states of the respective multiple outboard motors to correspond to the selected behavior pattern. With this arrangement, the marine vessel propulsion system including outboard motors can improve the operability when finely controlling the movement of the marine vessel.

Another preferred embodiment of the present invention provides a marine vessel including a hull and a marine vessel propulsion system mounted on the hull and having the above-described features. This arrangement can improve the operability when finely controlling the movement of the marine vessel while preventing the marine vessel propulsion system from having a complex structure.

Other elements, features, steps, characteristics and advantages of the present invention will become more apparent from the following detailed description of the preferred embodiments with reference to the attached drawings.

BRIEF DESCRIPTION OF THE DRAWINGS

FIG. 22 shows the relationship between the position of each operation lever and the shift state as well as steering angle of each outboard motor when the marine vessel propulsion system according to the second preferred embodiment is in the assisted marine vessel maneuvering mode.

DETAILED DESCRIPTION OF THE PREFERRED EMBODIMENTS

First Preferred Embodiment

First, the structure of a marine vessel propulsion system according to a first preferred embodiment of the present invention will hereinafter be described with reference to FIGS. 1 to 5.

Figure 1:
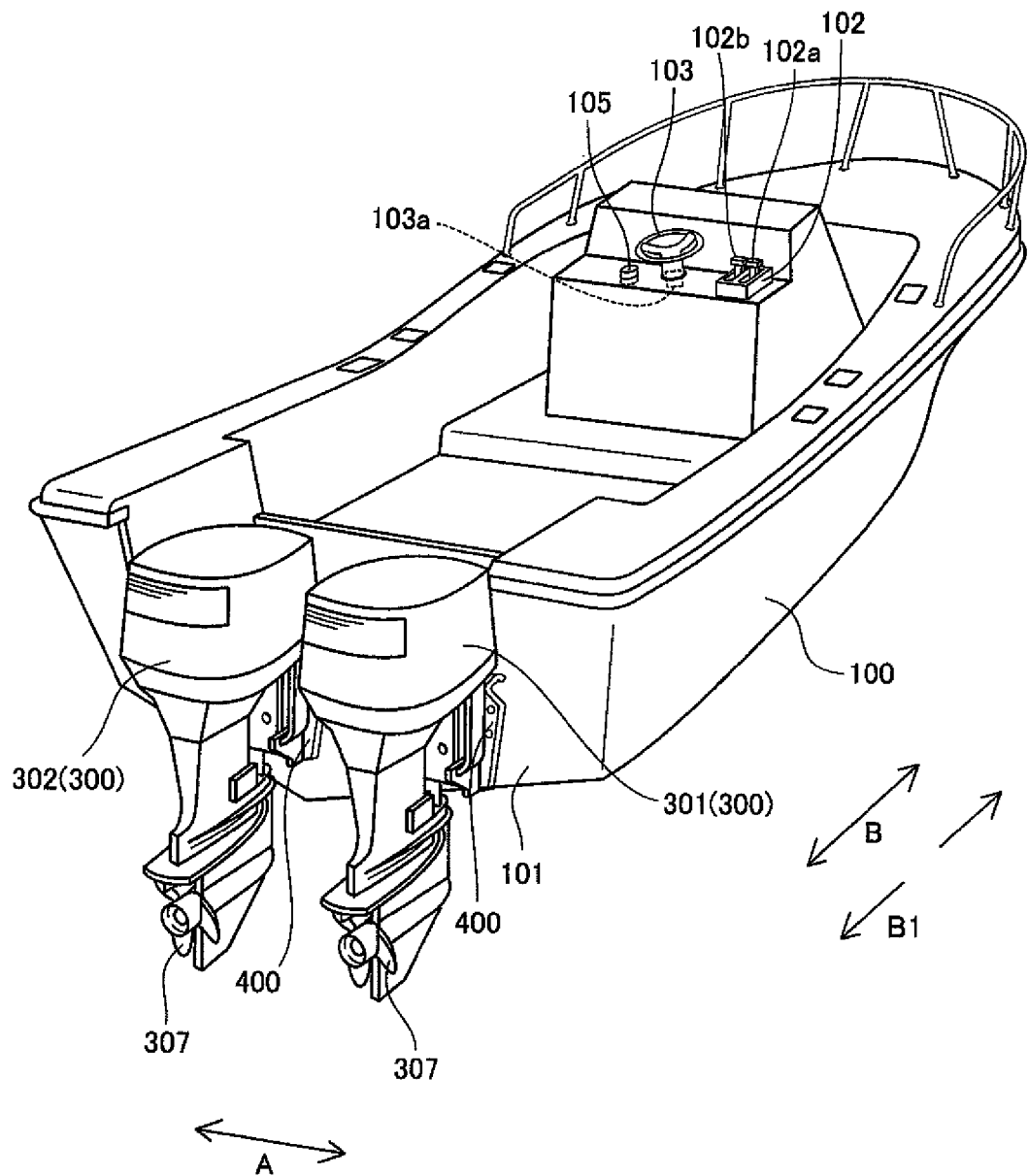
FIG. 1 is a perspective view showing the overall configuration of a marine vessel propulsion system according to a first preferred embodiment of the present invention.
Figure 2:
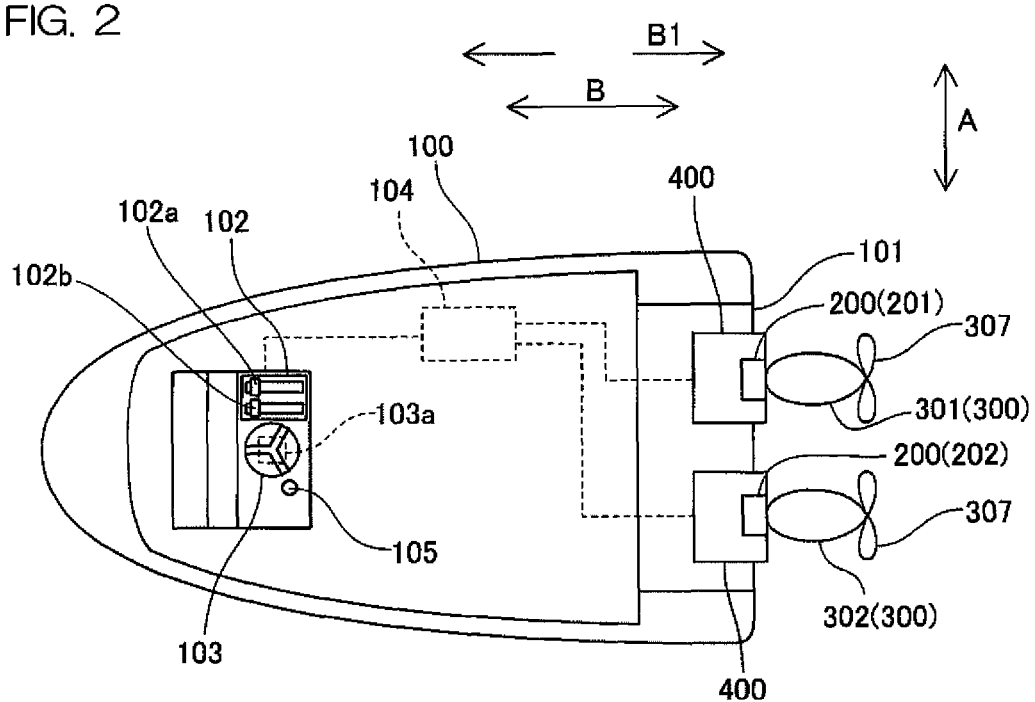
FIG. 2 is a schematic plan view showing the overall configuration of the marine vessel propulsion system.
Figure 5:
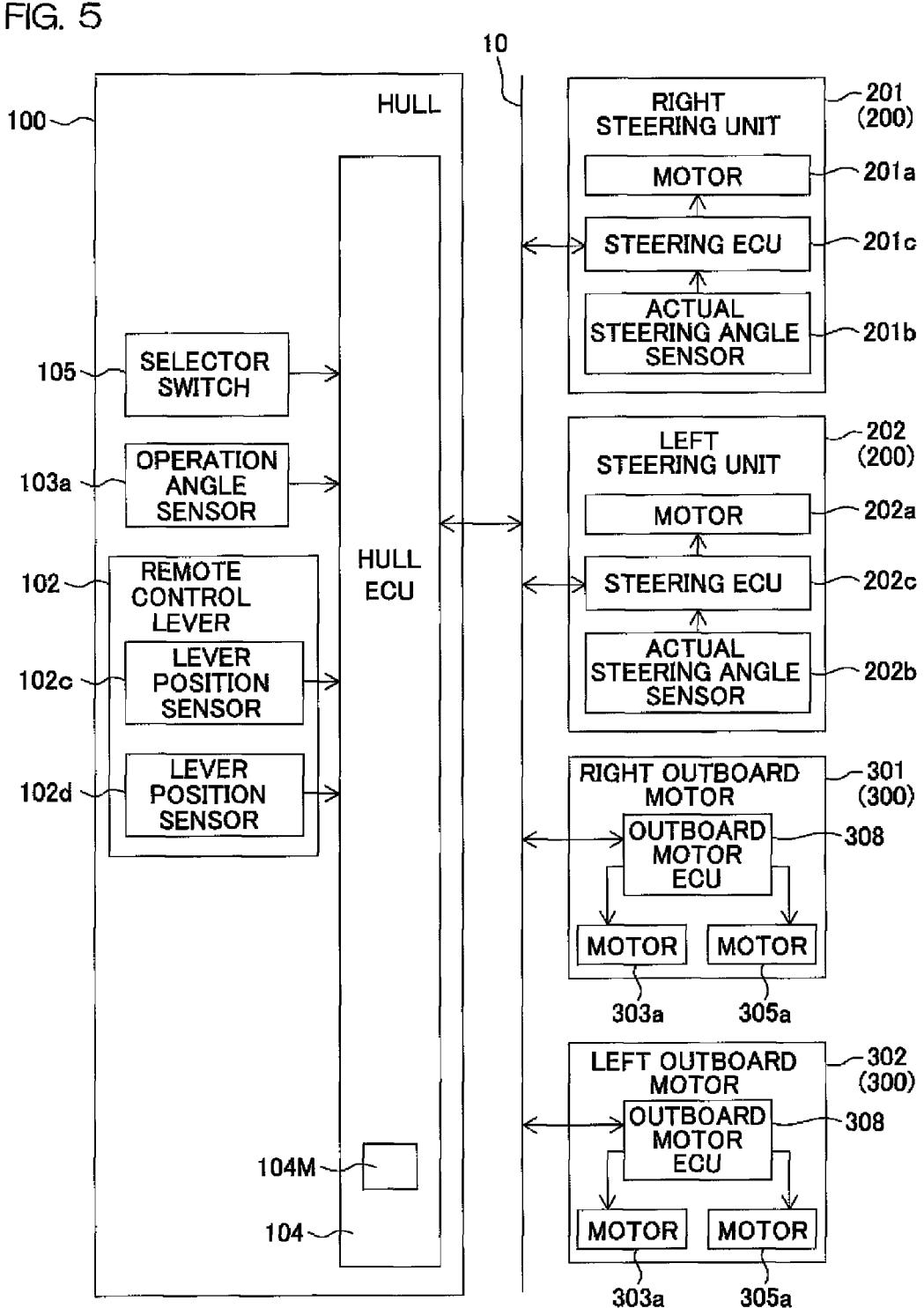
FIG. 5 is a block diagram showing the electrical configuration of the marine vessel propulsion system.

Two outboard motors 300 (right outboard motor 301 and left outboard motor 302) are mounted at the stern 101 of a hull 100 via two steering units 200 (right steering unit 201 and left steering unit 202) (see FIGS. 2 and 5). A remote control lever 102, a steering operation mechanism 103 such as a steering wheel, a hull ECU (Electronic Control Unit) 104, a trim switch (not shown), and the like are arranged on the hull 100. The remote control lever 102 is arranged to be operated by a marine vessel maneuvering operator to control switching the throttle opening degrees and shift states of the outboard motors 300. The steering operation mechanism 103 is arranged to be operated by the operator to change the heading direction of the hull 100. The hull ECU 104 is programmed to control the marine vessel propulsion system. The trim switch is arranged to be operated by the operator to change the mounting angle of the outboard motors 300 with respect to the hull 100. The outboard motors 300 and the hull ECU 104 are, respectively, examples of "propulsion devices" and "control unit" according to a preferred embodiment of the present invention.

The remote control lever 102 includes two operation levers (right operation lever 102a and left operation lever 102b) that correspond to the respective right and left outboard motors 301 and 302. The right and left operation levers 102a and 102b are arranged laterally (on the right and left in the direction A) and are arranged to be movable longitudinally (back and forth in the direction B) independently of each other. The operator can switch the shift state and perform acceleration control (throttle opening degree control) of the right outboard motor 301 by operating the right operation lever 102a. The operator can also switch the shift state and perform acceleration control of the left outboard motor 302 by operating the left operation lever 102b. The shift state of the outboard motors 301 and 302 can be selected from among neutral state, forward drive state, and reverse drive state. The right and left operation levers 102a and 102b are, respectively, examples of "first operation lever" and "second operation lever" according to a preferred embodiment of the present invention. Also, the right and left outboard motors 301 and 302 are, respectively, examples of "first propulsion device" and "second propulsion device" according to a preferred embodiment of the present invention.

Figure 3:
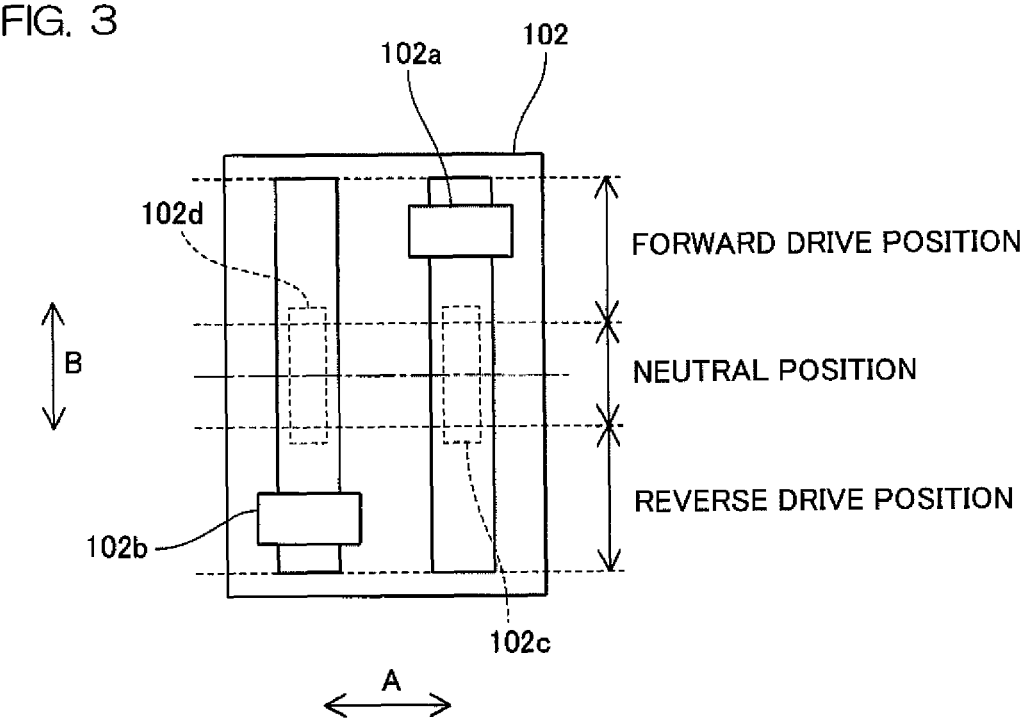
FIG. 3 is a schematic plan view of a control lever in the marine vessel propulsion system.

As shown in FIG. 3, the operation levers (right operation lever 102a and left operation lever 102b) are movable among a neutral position, a forward drive position, and a reverse drive position. The neutral position, forward drive position, and reverse drive position correspond, respectively, to the neutral state, forward drive state, and reverse drive state of the outboard motors 300. The marine vessel propulsion system is arranged to change the throttle opening degree (power output) of each outboard motor 300 according to the amount of displacement of the corresponding operation lever with respect to the neutral position when the operation lever is in the forward or reverse drive position. That is, the greater the amount of displacement of the operation lever with respect to the neutral position, the greater the throttle opening degree of the corresponding outboard motor 300 becomes. The remote control lever 102 includes lever position sensors 102c and 102d arranged to detect the turning angle of the operation levers, being provided correspondingly to the respective right and left operation levers 102a and 102b. The shift states and throttle opening degrees of the respective outboard motors 300 (right outboard motor 301 and left outboard motor 302) are controlled based on detection results from the lever position sensors 102c and 102d.

The steering operation mechanism 103 is also arranged to be operated by the operator to steer the outboard motors 300 (right outboard motor 301 and left outboard motor 302). The steering operation mechanism 103 is provided with an operation angle sensor 103a arranged to detect the rotation angle of the steering operation mechanism 103.

The steering units 200 (right steering unit 201 and left steering unit 202) are each mounted at the stern 101 of the hull 100 via a clamp bracket 400. As shown in FIG. 5, the right steering unit 201 includes a motor 201a arranged to turn the corresponding outboard motor 300 during steering, an actual steering angle sensor 201b arranged to detect the turning angle (actual steering angle) of the outboard motor 300, and a steering ECU 201c. Similarly, the left steering unit 202 includes a motor 202a arranged to turn the corresponding outboard motor 300 during steering, an actual steering angle sensor 202b arranged to detect the turning angle (actual steering angle) of the outboard motor 300, and a steering ECU 202c. The hull ECU 104 and the steering ECUs 201c and 202c are arranged to be capable of communicating information with each other via a LAN (Local Area Network) 10 built in the hull 100.

When the motors 201a and 202a are driven based on a detection result from the operation angle sensor 103a, the steering angles of the outboard motors 300 (right outboard motor 301 and left outboard motor 302) are adjusted accordingly. That is, when the bodies of the outboard motors 300 are turned horizontally, propellers 307 change their direction. This changes the heading direction of the hull 100 that depends on propulsive forces generated by the propellers 307.

The steering units 200 can change the steering angle of each outboard motor 300 preferably within an angular range of about 60 degrees (about ±30 degrees), for example. When the steering angles of the outboard motors 300 are adjusted based on a detection result from the operation angle sensor 103a, the motors 201a and 202a are controlled such that the right and left outboard motors 301 and 302 have substantially the same steering angle.

Figure 4:
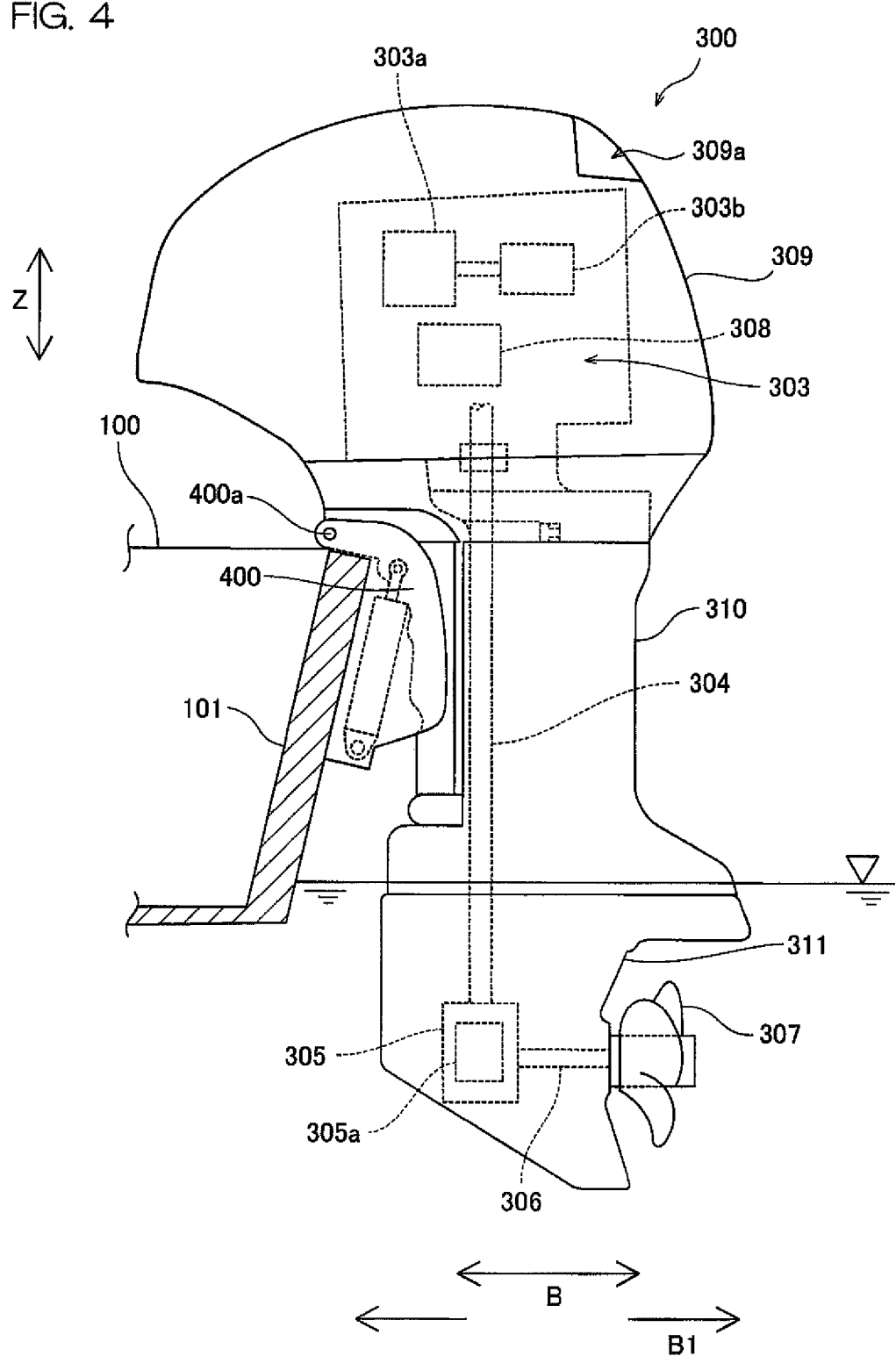
FIG. 4 is a side view of an outboard motor in the marine vessel propulsion system.

As shown in FIG. 4, the outboard motors 300 each include an engine 303, a drive shaft 304, a forward-reverse switching mechanism 305, a propeller shaft 306, a propeller 307, and an outboard motor ECU 308. The engine 303 is arranged to generate a driving force by burning a mixture of air and fuel. The drive shaft 304 extends in the vertical direction (in the Z direction) and is arranged to be rotated by a driving force from the engine 303. The forward-reverse switching mechanism 305 is connected to the lower end of the drive shaft 304. The propeller shaft 306 is connected to the forward-reverse switching mechanism 305 and extends in the horizontal direction. The propeller 307 is fixed at the rear end portion of the propeller shaft 306. The outboard motor ECU 308 is arranged to control the operations of the engine 303 and the forward-reverse switching mechanism 305. The hull ECU 104 and the outboard motor ECUs 308 in the right and left outboard motors are arranged to be capable of communicating information with each other via the LAN 10.

The engine 303 includes a motor 303a and a throttle valve 303b. The throttle valve 303b is provided in a feed path for feeding air therethrough into a mixture combustion chamber (not shown). The throttle valve 303b is arranged to be opened and closed by a driving force from the motor 303a within the range from the fully-closed state (with an opening degree of 0%) to the fully-opened state (with an opening degree of 100%). The motor 303a is controlled by the outboard motor ECU 308. The driving force of the engine 303 can be adjusted by controlling the opening degree (throttle opening degree) of the throttle valve 303b and therefore the feed amount of air.

The forward-reverse switching mechanism 305 is arranged to set a shift state selected from among forward drive state, reverse drive state, and neutral state. The forward drive state is a shift state in which the rotation of the drive shaft 304 caused by a driving force from the engine 303 is transmitted to rotate the propeller shaft 306 in the forward drive direction. The reverse drive state is a shift state in which the rotation of the drive shaft 304 is reversed and transmitted to rotate the propeller shaft 306 in the reverse drive direction. The neutral state is a shift state in which the transmitting of the rotation from the drive shaft 304 to the propeller shaft 306 is blocked off. The shift state is switched by a driving force from a motor 305a. The motor 305a is controlled by the outboard motor ECU 308.

The outboard motor ECU 308 controls the motors 303a and 305a and other electrical components in the outboard motor 300 based on signals from the hull ECU 104. The forward-reverse switching mechanism 305 is an example of a "switching mechanism portion" according to a preferred embodiment of the present invention.

The engine 303 is housed in an engine cover 309. An upper case 310 and a lower case 311 are arranged below the engine cover 309, and the drive shaft 304 and the forward-reverse switching mechanism 305 as well as the propeller shaft 306 are housed in the respective cases 310 and 311. A ventilation hole 309a is provided in a lateral portion of the engine cover 309 on the side of the reverse drive direction (indicated by the arrow B1). Air which is introduced in the engine cover 309 via the ventilation hole 309a, is fed to the engine 303.

The outboard motors 300 are each mounted at the stern 101 of the hull 100 via a clamp bracket 400. The clamp bracket 400 supports each outboard motor 300 in a vertically swingable manner about a tilting shaft 400a with respect to the hull 100.

The hull 100 is provided with a selector switch 105 to be operated by the operator to switch control modes. The control modes include a normal marine vessel maneuvering mode in which the steering operation mechanism 103 is used for marine vessel maneuvering and an assisted marine vessel maneuvering mode in which the steering operation mechanism 103 is not required to be used for marine vessel maneuvering. One of these control modes can be selected by operating the selector switch 105.

In the normal marine vessel maneuvering mode, the shift states and throttle opening degrees of the respective right and left outboard motors 301 and 302 are controlled based on detection results from the lever position sensors 102c and 102d. The steering angle of the outboard motors 300 (right outboard motor 301 and left outboard motor 302) is also controlled based on a detection result from the operation angle sensor 103a.

In the assisted marine vessel maneuvering mode, the shift states, throttle opening degrees, and steering angles of the respective right and left outboard motors 301 and 302 are controlled based on detection results from the lever position sensors 102c and 102d.

The operator can switch between the normal marine vessel maneuvering mode and the assisted marine vessel maneuvering mode by switching the selector switch 105 ON and OFF. That is, when the selector switch 105 is OFF, the normal marine vessel maneuvering mode runs. When the selector switch 105 is ON, the assisted marine vessel maneuvering mode runs. In the assisted marine vessel maneuvering mode, when the steering operation mechanism 103 is operated, the selector switch 105 is turned OFF automatically by the control of the hull ECU 104 and the normal marine vessel maneuvering mode runs automatically. The selector switch 105 is an example of a "switching unit" according to a preferred embodiment of the present invention.

In the normal marine vessel maneuvering mode, the hull ECU 104 determines the shift states and throttle opening degrees of the right and left outboard motors 301 and 302 based on positional information of the operation levers detected by the lever position sensors 102c and 102d. These determined shift states and throttle opening degrees are sent to the outboard motor ECUs 308. The outboard motor ECUs 308 control the motors 303a and 305a based on the received shift states and throttle opening degrees to drive the throttle valve 303b and the forward-reverse switching mechanism 305. The hull ECU 104 also determines the steering angles of the right and left outboard motors 301 and 302 based on an operation angle detected by the operation angle sensor 103a, and sends the determined steering angle data to the steering ECUs 201c and 202c. The steering ECUs 201c and 202c drive the motors 201a and 202a in the respective right and left steering units 201 and 202 to make actual steering angles detected by the respective actual steering angle sensors 201b and 202b equal to the received steering angles.

Figure 6A:
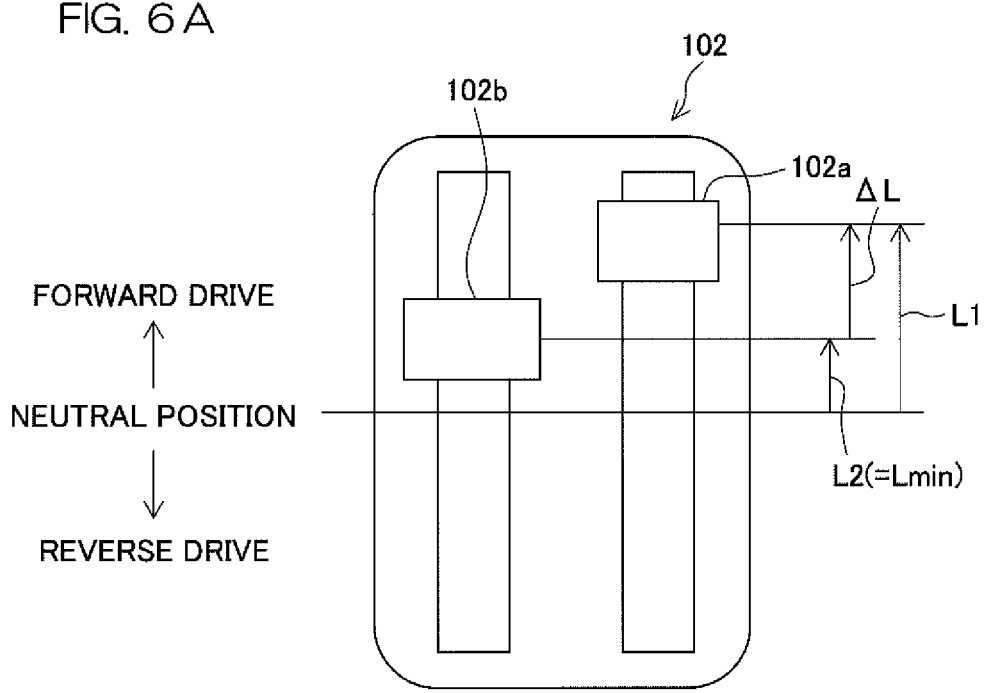
FIGS. 6A and 6B illustrate settings of target values in an assisted marine vessel maneuvering mode.
Figure 6B:
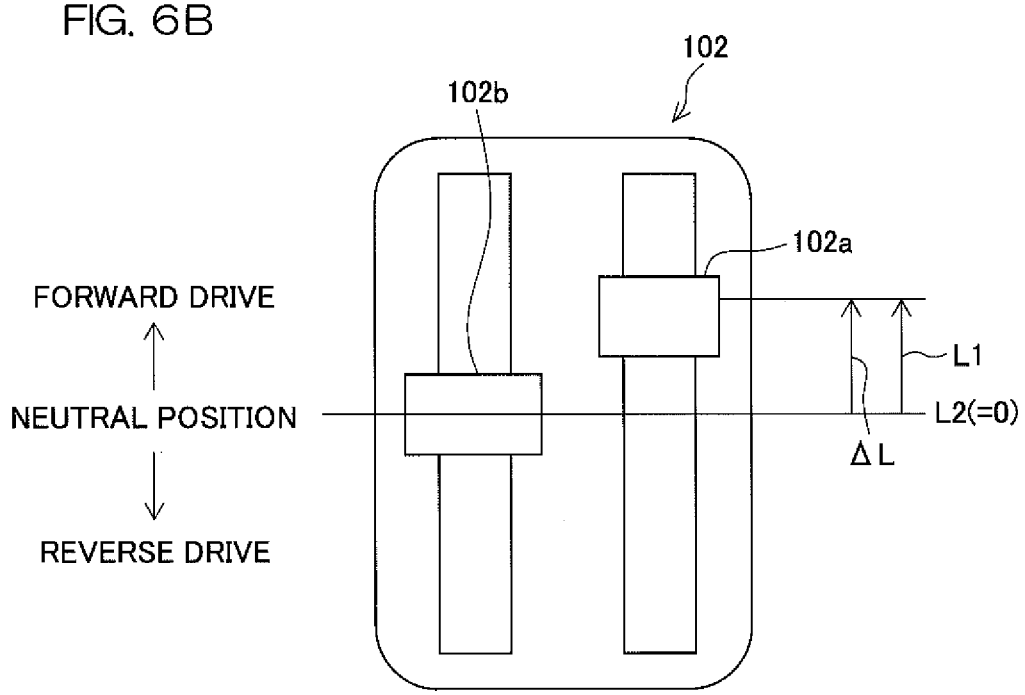

FIGS. 6A and 6B are graphical plan views of the remote control lever 102, illustrating settings of target values in the assisted marine vessel maneuvering mode. The hull ECU 104 is arranged to set a target pivoting speed and a target travel speed of the hull 100 based on the position L1 of the right operation lever 102a and the position L2 of the left operation lever 102b. The positions L1 and L2 are expressed as a positive value when on the forward drive side with respect to the neutral position, and are expressed as a negative value when on the reverse drive side with respect to the neutral position.

The absolute values |L1| and |L2| of the positions L1 and L2 are the amounts of displacement of the respective right and left operation levers 102a and 102b with respect to the neutral position. These positions L1 and L2 are obtained as outputs from the lever position sensors 102c and 102d. The target pivoting speed of the hull 100 is expressed as a positive value in the counterclockwise direction, and is expressed as a negative value in the clockwise direction in the plan view. Also, the target travel speed of the hull 100 is expressed as a positive value in the forward travel direction, and is expressed as a negative value in the reverse travel direction.

The hull ECU 104 subtracts the position L2 of the left operation lever 102b from the position L1 of the right operation lever 102a to obtain a lever position difference $\Delta L$ (=L1−L2). The hull ECU 104 then obtains the target pivoting speed based on this lever position difference $\Delta L$.

The hull ECU 104 further determines if the positions L1 and L2 of the right and left operation levers 102a and 102b have the same sign or their respective different signs. That is, it is determined if the right and left operation levers 102a and 102b are on the same side (forward or reverse drive side) with respect to the neutral position. If the positions L1 and L2 of the right and left operation levers 102a and 102b have their respective different signs, the hull ECU 104 sets the target travel speed to zero. On the other hand, if the positions L1 and L2 of the right and left operation levers 102a and 102b have the same sign, the hull ECU 104 identifies a smaller one of the amounts of displacement |L1| and |L2| of the right and left operation levers 102a and 102b. The hull ECU 104 then obtains the target travel speed based on the position Lmin (=L1 or L2, hereinafter referred to as "minimum displacement position Lmin") corresponding to the smaller amount of displacement. If either of the absolute amount of displacement |L1| or |L2| is zero, the target travel speed is also set to zero.

FIG. 6A shows the case of $\Delta L > 0$ and Lmin=L2>0. Accordingly, the target pivoting speed is positive and the target travel speed is also positive. As a result, the outboard motors 300 are controlled such that the hull 100 pivots counterclockwise while moving forward (i.e., turns in the left-forward direction). On the other hand, FIG. 6B shows the case of $\Delta L > 0$ and Lmin=L2=0. Accordingly, the target pivoting speed is positive and the target travel speed is zero. As a result, the outboard motors 300 are controlled such that the hull 100 pivots counterclockwise substantially with no displacement. This behavior of the hull 100 is similar to a behavior of the hull corresponding to the same lever operations in the normal marine vessel maneuvering mode. Therefore, the operator can perform marine vessel maneuvering in the assisted marine vessel maneuvering mode while having an improved and more comfortable natural feeling.

Figure 7:
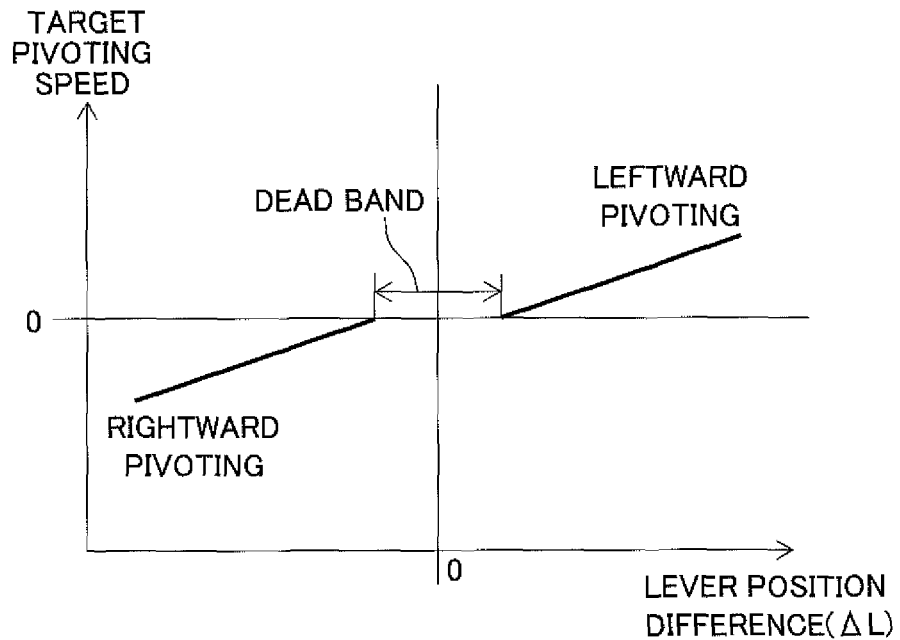
FIG. 7 is a graph showing an example of target pivoting speed setting based on the difference between lever positions.

FIG. 7 is a graph showing an example of target pivoting speed setting based on the lever position difference $\Delta L$. A dead band with a predetermined width is provided in the vicinity of the lever position difference $\Delta L=0$ such that the target pivoting speed is zero if the absolute value of the lever position difference $\Delta L$ is smaller than a predetermined value. When the lever position difference $\Delta L$ is greater than the dead band, the target pivoting speed is set to a positive value. On the other hand, when the lever position difference $\Delta L$ is smaller than the dead band, the target pivoting speed is set to a negative value. Then, the absolute target pivoting speed increases monotonically (linearly in FIG. 7) with the increase in the absolute value of the lever position difference $\Delta L$.

Figure 8:
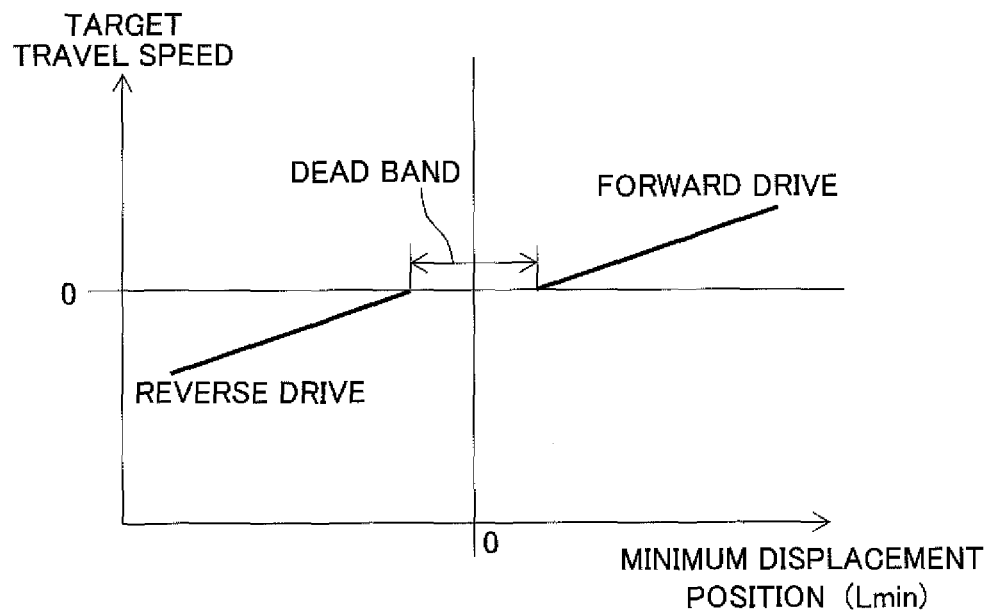
FIG. 8 is a graph showing an example of target travel speed setting based on the minimum displacement position.

FIG. 8 is a graph showing an example of target travel speed setting based on the minimum displacement position Lmin. A dead band with a predetermined width is provided in the vicinity of the minimum displacement position Lmin=0 such that the target travel speed is zero if the absolute value of the minimum displacement position Lmin is smaller than a predetermined value. When the minimum displacement position Lmin is greater than the dead band, the target travel speed is set to a positive value (for forward travel). On the other hand, when the minimum displacement position Lmin is smaller than the dead band, the target travel speed is set to a negative value (for reverse travel). Then, the absolute target travel speed increases monotonically (linearly in FIG. 8) with the increase in the absolute value of the minimum displacement position Lmin.

Figure 9:
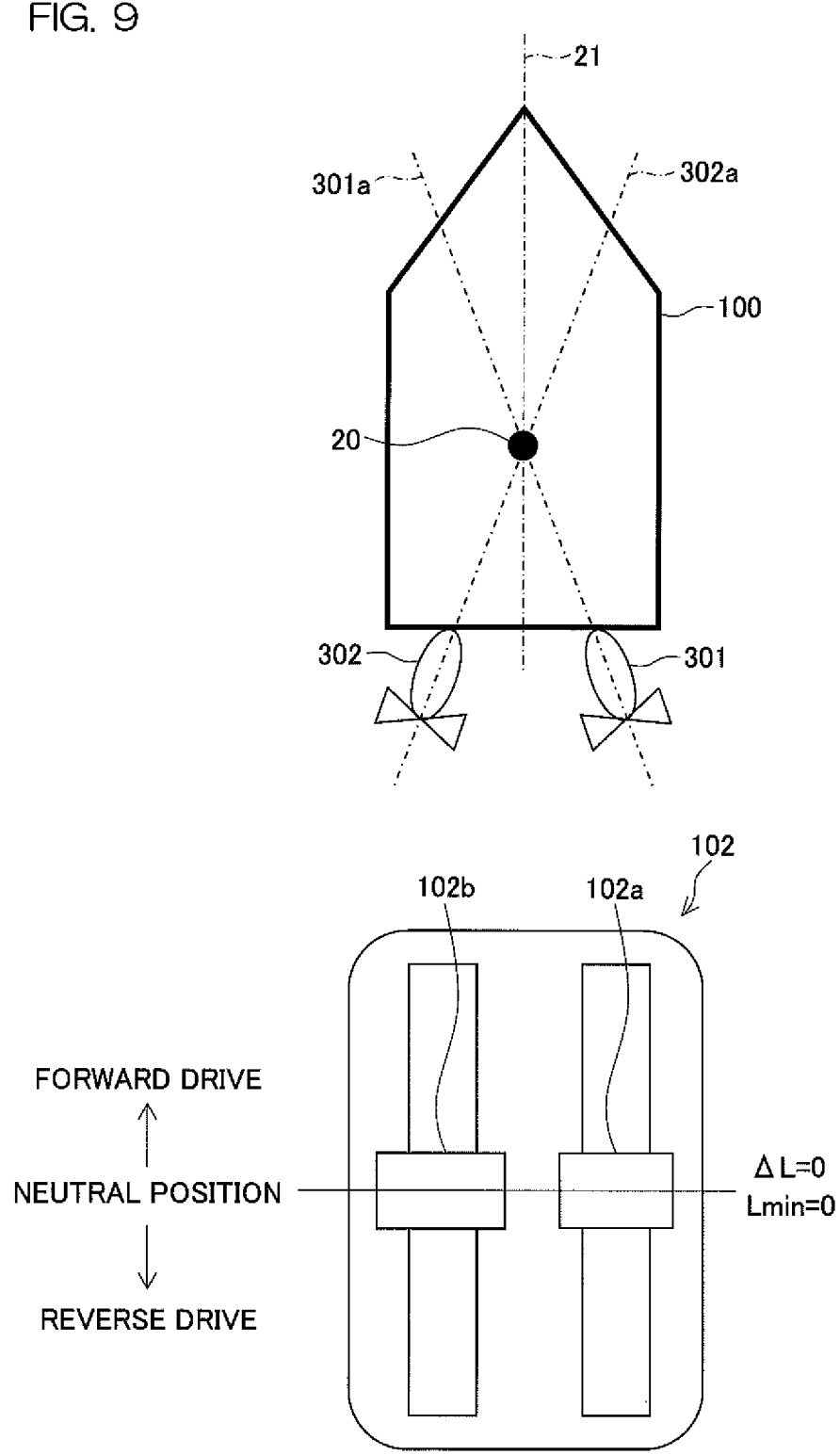
FIG. 9 is a graphical plan view showing a basic posture of outboard motors immediately after being switched to the assisted marine vessel maneuvering mode.

FIG. 9 is a graphical plan view showing a basic posture of the outboard motors 301 and 302 immediately after being switched to the assisted marine vessel maneuvering mode. When the selector switch 105 is operated to run the assisted marine vessel maneuvering mode, the hull ECU 104 controls the outboard motors 301 and 302 to be in the basic posture shown in FIG. 9. More specifically, the hull ECU 104 sets the target steering angles of the outboard motors 301 and 302 such that the straight lines 301a and 302a in the directions of the propulsive forces of the respective outboard motors 301 and 302 pass through the rotational center 20 of the hull 100 in a plan view. That is, in the basic posture, the outboard motors 301 and 302 are in a positional relationship in which the rear end portions thereof are separated from each other. When the target steering angles corresponding to this basic posture are transmitted to the steering ECUs 201c and 202c via the LAN 10, the right and left outboard motors 301 and 302 are turned to be in the basic posture shown in FIG. 9. When both the right and left operation levers 102a and 102b are in the neutral position, $\Delta L=0$ and Lmin=0. In this case, the right and left outboard motors 301 and 302 are controlled to be in the basic posture, their shift states are controlled to be the neutral position, and their engine speeds are controlled to be an idle speed. That is, the target throttle opening degree is set to a fully-closed value correspondingly to the idle speed.

It is noted that the steering angle takes a positive value when the rear end portions (propellers 307) of the outboard motors 301 and 302 are turned rightward with respect to the longitudinal direction of the hull 100 (along the hull centerline 21), while taking a negative value when turned leftward. Thus, in the basic posture, the steering angle of the right outboard motor 301 is positive and the steering angle of the left outboard motor 302 is negative.

Figure 10:
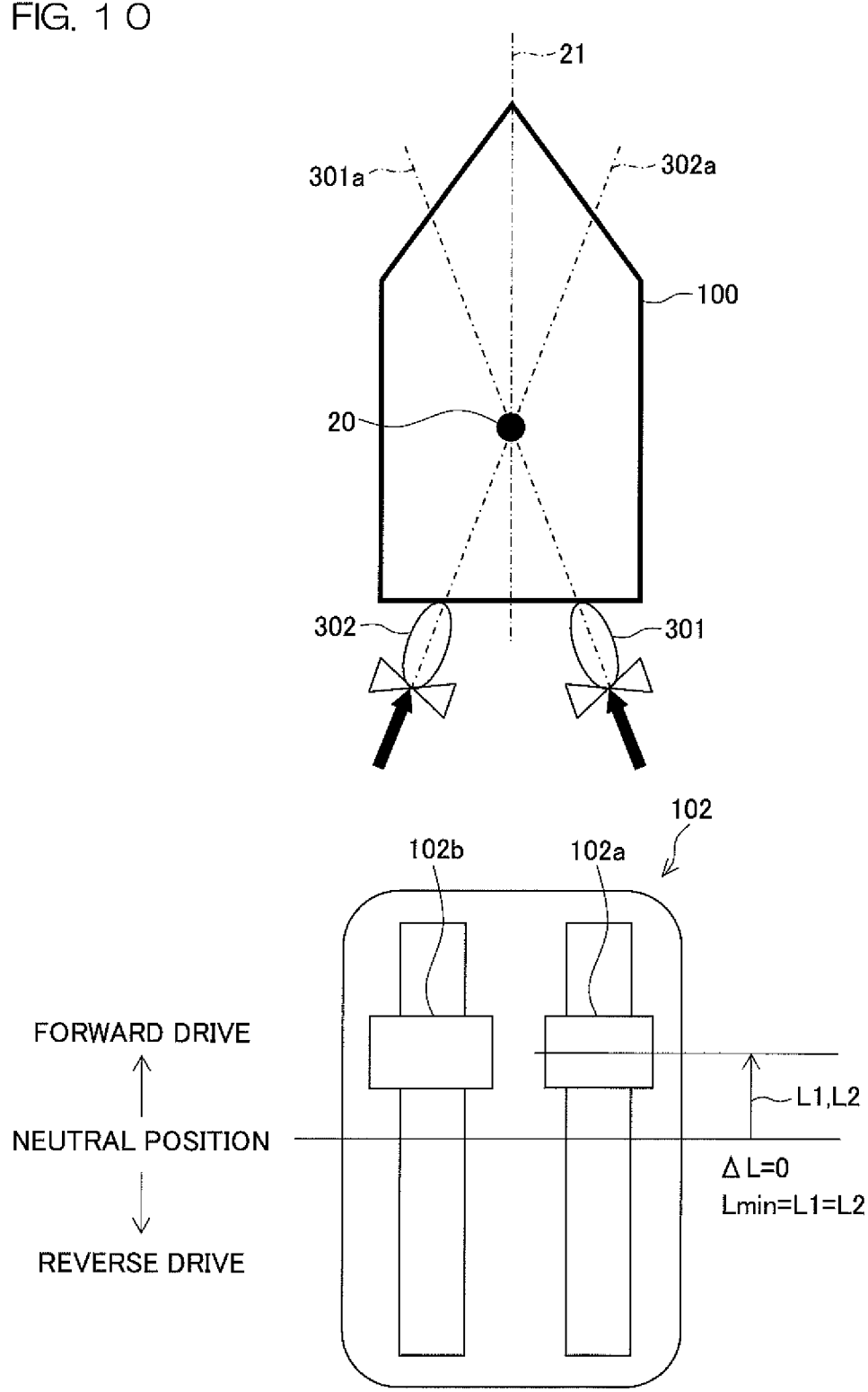
FIG. 10 illustrates the operation when right and left operation levers are operated to be in the same position on the forward drive side in the assisted marine vessel maneuvering mode.

FIG. 10 shows the state where the right and left operation levers 102a and 102b are operated to be in the same position on the forward drive side in the assisted marine vessel maneuvering mode. In this case, since $\Delta L=0$ and Lmin>0, the target pivoting speed is set to zero and the target travel speed is set to a positive value. Therefore, the outboard motors 301 and 302 are controlled such that the hull 100 moves straight ahead. Specifically, the hull ECU 104 sets the target steering angles of the outboard motors 301 and 302 to the steering angles in the basic posture. The hull ECU 104 also sets both the target shift states of the outboard motors 301 and 302 to the forward drive state. The hull ECU 104 further sets the target throttle opening degrees (target engine speeds) of the outboard motors 301 and 302 to a value corresponding to the minimum displacement position Lmin.

The target steering angles are transmitted to the steering ECUs 201c and 202c via the LAN 10. This causes both the outboard motors 301 and 302 to be controlled to be in the basic posture and their propulsive forces (indicated by arrows in FIG. 10) are directed to the rotational center 20 of the hull 100. The target shift states (set to forward drive state) and the target throttle opening degrees (target engine speeds) are transmitted to the outboard motor ECUs 308 in the right and left outboard motors 301 and 302 via the LAN 10. This causes both the shift states of the right and left outboard motors 301 and 302 to be controlled to be the forward drive state, and the right and left outboard motors 301 and 302 have approximately the same engine speed. As a result, the resultant force of the propulsive forces of the right and left outboard motors 301 and 302 is directed to the forward travel direction of the hull 100. Since both the propulsive forces of the right and left outboard motors 301 and 302 act in the direction through the rotational center 20 of the hull 100, the hull 100 moves forward without substantially pivoting. That is, the hull 100 moves forward along its centerline 21.

Figure 11:
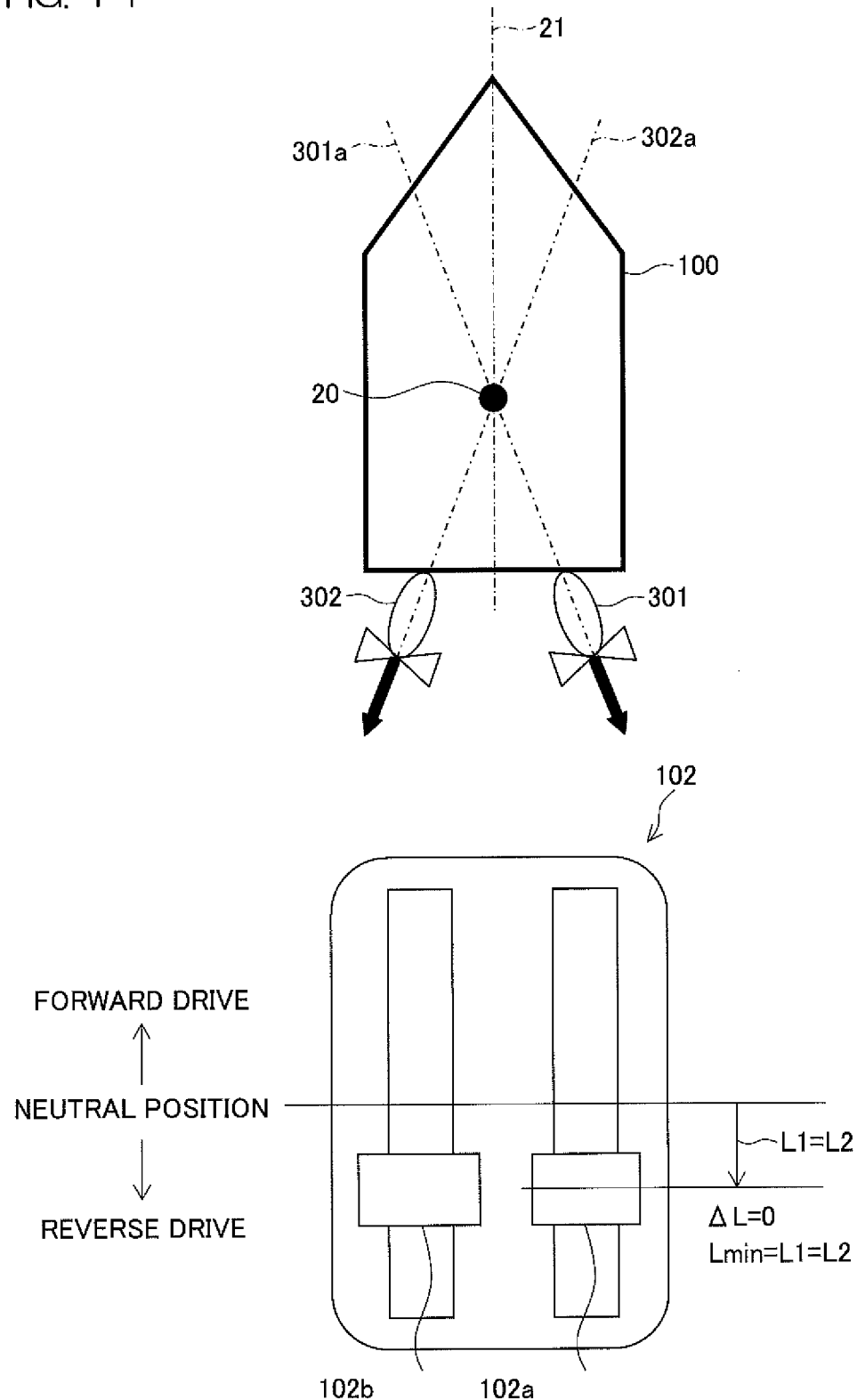
FIG. 11 illustrates the operation when the right and left operation levers are operated to be in the same position on the reverse drive side in the assisted marine vessel maneuvering mode.

FIG. 11 shows the state where the right and left operation levers 102a and 102b are operated to be in the same position on the reverse drive side in the assisted marine vessel maneuvering mode. In this case, since ΔL=0 and Lmin<0, the target pivoting speed is set to zero and the target travel speed is set to a negative value. Therefore, the outboard motors 301 and 302 are controlled such that the hull 100 moves straight astern. Specifically, the hull ECU 104 sets the target steering angles of the outboard motors 301 and 302 to the steering angles in the basic posture. The hull ECU 104 also sets both the target shift states of the outboard motors 301 and 302 to the reverse drive state. The hull ECU 104 further sets the target throttle opening degrees (target engine speeds) of the outboard motors 301 and 302 to a value corresponding to the minimum displacement position Lmin.

The target steering angles are transmitted to the steering ECUs 201c and 202c via the LAN 10. This causes both the outboard motors 301 and 302 to be controlled to be in the basic posture and their propulsive forces (indicated by arrows in FIG. 11) are directed backward along the respective straight lines 301a and 302a that pass through the rotational center 20 of the hull 100. The target shift states (set to reverse drive state) and the target throttle opening degrees (target engine speeds) are transmitted to the outboard motor ECUs 308 in the right and left outboard motors 301 and 302 via the LAN 10. This causes both the shift states of the right and left outboard motors 301 and 302 to be controlled to the reverse drive state, and the right and left outboard motors 301 and 302 have approximately the same engine speed. As a result, the resultant force of the propulsive forces of the right and left outboard motors 301 and 302 is directed to the reverse travel direction of the hull 100. Since both the propulsive forces of the right and left outboard motors 301 and 302 act in the direction through the rotational center 20 of the hull 100, the hull 100 moves backward without substantially pivoting. That is, the hull 100 moves backward along its centerline 21.

Figure 12:
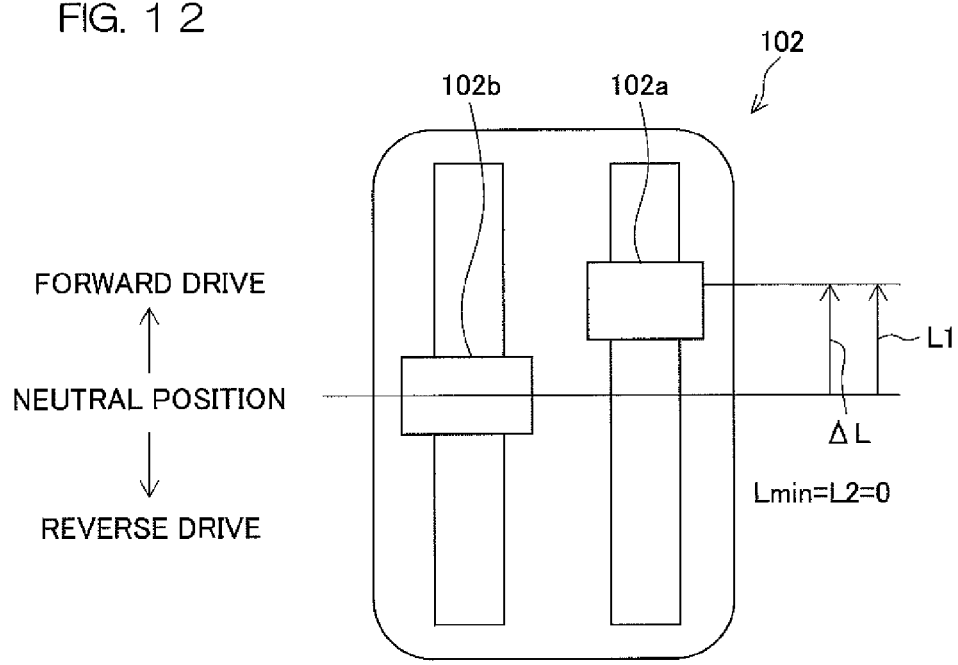
FIG. 12 shows the state where the right operation lever is on the forward drive side and the left operation lever is in the neutral position in the assisted marine vessel maneuvering mode.

FIG. 12 shows the state where the right operation lever 102a is on the forward drive side and the left operation lever 102b is in the neutral position in the assisted marine vessel maneuvering mode. In this case, since ΔL>0 and Lmin=0, the target pivoting speed is set to a positive value and the target travel speed is set to zero. Therefore, the outboard motors 301 and 302 are controlled such that the hull 100 pivots counterclockwise substantially with no displacement. The hull ECU 104 controls the outboard motors 301 and 302 to be in the state shown in FIG. 12A or 12B, for example.

Figure 12A:
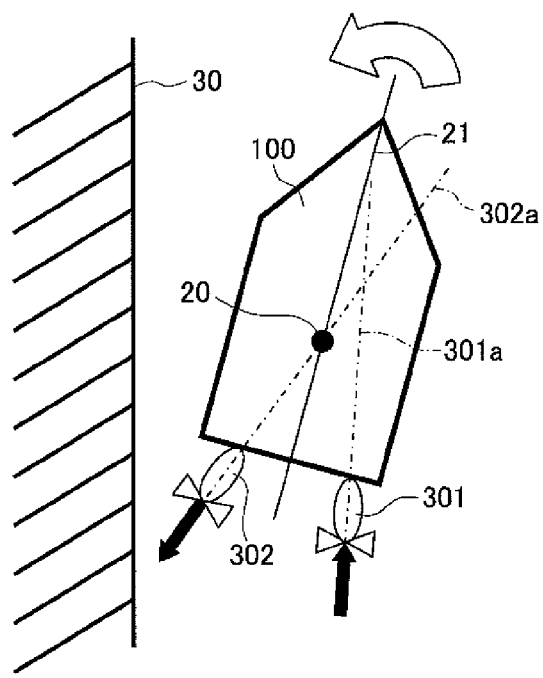
FIG. 12A shows an example of the posture of the outboard motors corresponding to the lever position.

FIG. 12A shows the state where the steering angle of the right outboard motor 301 is made smaller than that in the basic posture and its propulsive force is directed right-forward with respect to the rotational center 20 of the hull 100. The left outboard motor 302 is in the basic posture. That is, the hull ECU 104 sets the target steering angle of the right outboard motor 301 to a value smaller than the steering angle in the basic posture. The hull ECU 104 also sets the target shift state of the right outboard motor 301 to the forward drive state and the target throttle opening degree (target engine speed) of the right outboard motor 301 to a value corresponding to the lever position difference ΔL. This causes the propulsive force of the right outboard motor 301 to apply a (counterclockwise) moment about the rotational center 20 to the hull 100.

It is, however, noted that the propulsive force of the right outboard motor 301 also acts as a propulsive force in the forward travel direction of the hull 100. Hence, the hull ECU 104 controls the left outboard motor 302 to generate a propulsive force in the reverse travel direction. More specifically, the hull ECU 104 sets the target steering angle of the left outboard motor 302 to a value corresponding to the basic posture and the target shift state of the left outboard motor 302 to the reverse drive state. The hull ECU 104 also sets the target throttle opening degree (target engine speed) of the left outboard motor 302 to a value with which the propulsive force in the forward travel direction (anteroposterior component) by the right outboard motor 301 can be cancelled. Thus, only a counterclockwise moment about the rotational center 20 acts on the hull 100, which allows the hull 100 to pivot counterclockwise substantially with no displacement. In more detail, a moment is applied to the hull 100 by the propulsive force of the right outboard motor 301 in the forward travel direction with the movement of the hull 100 being restricted by the left outboard motor 302. This results in the hull 100 pivoting in such a manner that its stern moves leftward.

Figure 12B:
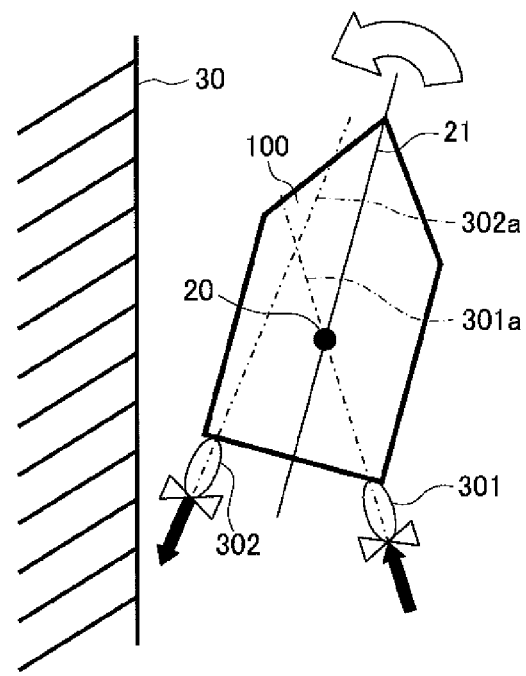
FIG. 12B shows another example of the posture of the outboard motors corresponding to the lever position.

FIG. 12B shows the state where the steering angle of the left outboard motor 302 is made greater (smaller in its absolute value) than that in the basic posture and its propulsive force is directed backward along the straight line 302a that passes on the left of the rotational center 20 of the hull 100. The right outboard motor 301 is in the basic posture. That is, the hull ECU 104 sets the target steering angle of the left outboard motor 302 to a value smaller than the steering angle in the basic posture. The hull ECU 104 also sets the target shift state of the left outboard motor 302 to the reverse drive state and the target throttle opening degree (target engine speed) of the left outboard motor 302 to a value corresponding to the lever position difference ΔL. This causes the propulsive force of the left outboard motor 302 to apply a (counterclockwise) moment about the rotational center 20 to the hull 100.

It is, however, noted that the propulsive force of the left outboard motor 302 also acts as a propulsive force in the reverse travel direction of the hull 100. Hence, the hull ECU 104 controls the right outboard motor 301 to generate a propulsive force in the forward travel direction. More specifically, the hull ECU 104 sets the target steering angle of the right outboard motor 301 to a value corresponding to the basic posture and the target shift state of the right outboard motor 301 to the forward drive state. The hull ECU 104 also sets the target throttle opening degree (target engine speed) of the right outboard motor 301 to a value with which the propulsive force in the reverse travel direction (anteroposterior component) by the left outboard motor 302 can be cancelled. Thus, only a (counterclockwise) moment about the rotational center 20 acts on the hull 100, which allows the hull 100 to pivot counterclockwise with no substantial displacement. In more detail, a moment is applied to the hull 100 by the propulsive force of the left outboard motor 302 in the forward drive direction with the movement of the hull 100 being restricted by the right outboard motor 301. This results in the hull 100 pivoting in such a manner that its stern moves leftward.

The counterclockwise pivoting can thus be realized in which the stern of the hull 100 moves leftward. This facilitates, for example, docking on a docking target 30 such as a quay.

Figure 13:
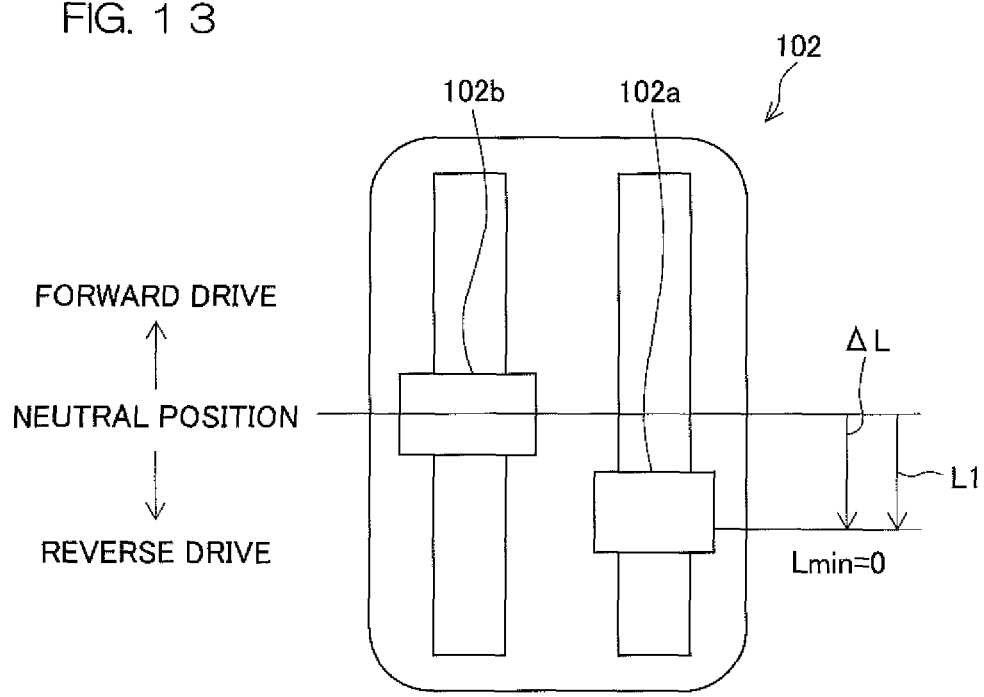
FIG. 13 shows the state where the right operation lever is on the reverse drive side and the left operation lever is in the neutral position in the assisted marine vessel maneuvering mode.

FIG. 13 shows the state where the right operation lever 102*a* is on the reverse drive side and the left operation lever 102*b* is in the neutral position in the assisted marine vessel maneuvering mode. In this case, since ΔL<0 and Lmin=0, the target pivoting speed is set to a negative value and the target travel speed is set to zero. Therefore, the outboard motors 301 and 302 are controlled such that the hull 100 pivots clockwise with no substantial displacement. The hull ECU 104 controls the outboard motors 301 and 302 to be the state shown in FIG. 13A or 13B, for example.

Figure 13A:
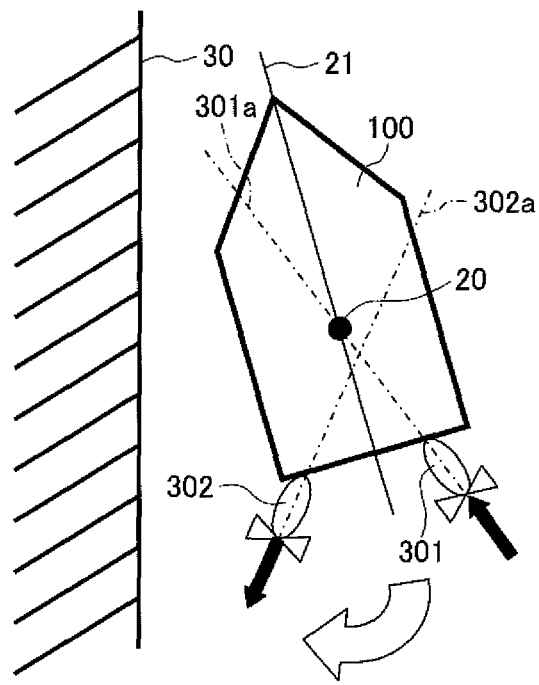
FIG. 13A shows an example of the posture of the outboard motors corresponding to the lever position.

FIG. 13A shows the state where the steering angle of the left outboard motor 302 is made smaller (greater in its absolute value) than that in the basic posture and its propulsive force is directed backward along the straight line 302*a* that passes on the right of the rotational center 20 of the hull 100. The right outboard motor 301 is in the basic posture. That is, the hull ECU 104 sets the target steering angle of the left outboard motor 302 to a negative value smaller (greater in its absolute value) than the steering angle in the basic posture. The hull ECU 104 also sets the target shift state of the left outboard motor 302 to the reverse drive state and the target throttle opening degree (target engine speed) of the left outboard motor 302 to a value corresponding to the lever position difference ΔL. This causes the propulsive force of the left outboard motor 302 to apply a (clockwise) moment about the rotational center 20 to the hull 100.

It is, however, noted that the propulsive force of the left outboard motor 302 also acts as a propulsive force in the reverse travel direction of the hull 100. Hence, the hull ECU 104 controls the right outboard motor 301 to generate a propulsive force in the forward travel direction. More specifically, the hull ECU 104 sets the target steering angle of the right outboard motor 301 to a value corresponding to the basic posture and the target shift state of the right outboard motor 301 to the forward drive state. The hull ECU 104 also sets the target throttle opening degree (target engine speed) of the right outboard motor 301 to a value with which the propulsive force in the reverse travel direction (anteroposterior component) by the left outboard motor 302 can be cancelled. Thus, only a clockwise moment about the rotational center 20 acts on the hull 100, which allows the hull 100 to pivot clockwise with no substantial displacement. In more detail, a moment is applied to the hull 100 by the propulsive force of the left outboard motor 302 in the reverse travel direction with the movement of the hull 100 being restricted by the right outboard motor 301. This results in the hull 100 pivoting such that its stern moves leftward.

Figure 13B:
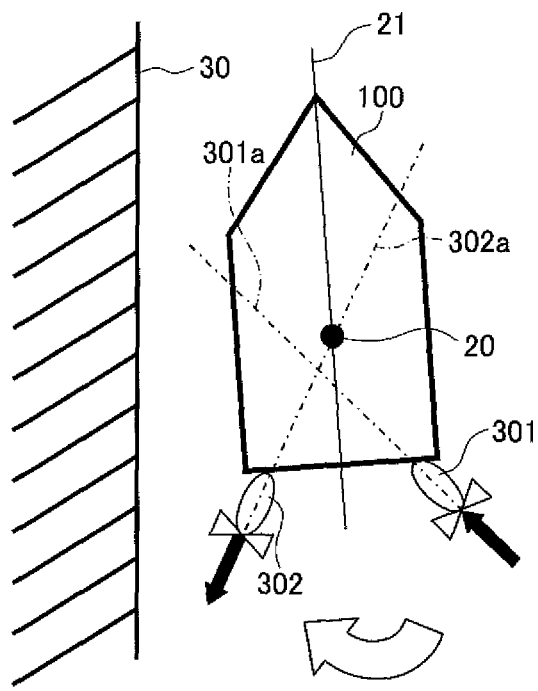
FIG. 13B shows another example of the posture of the outboard motors corresponding to the lever position.

FIG. 13B shows the state where the steering angle of the right outboard motor 301 is made greater than that in the basic posture and its propulsive force is directed forward along the straight line 301*a* that passes on the left of the rotational center 20 of the hull 100. The left outboard motor 302 is in the basic posture. That is, the hull ECU 104 sets the target steering angle of the right outboard motor 301 to a value greater than the steering angle in the basic posture. The hull ECU 104 also sets the target shift state of the right outboard motor 301 to the forward drive state and the target throttle opening degree (target engine speed) of the right outboard motor 301 to a value corresponding to the lever position difference ΔL. This causes the propulsive force of the right outboard motor 301 to apply a (clockwise) moment about the rotational center 20 to the hull 100.

It is, however, noted that the propulsive force of the right outboard motor 301 also acts as a propulsive force in the forward travel direction of the hull 100. Hence, the hull ECU 104 controls the left outboard motor 302 to generate a propulsive force in the reverse travel direction. More specifically, the hull ECU 104 sets the target steering angle of the left outboard motor 302 to a value corresponding to the basic posture and the target shift state of the left outboard motor 302 to the reverse drive state. The hull ECU 104 also sets the target throttle opening degree (target engine speed) of the left outboard motor 302 to a value with which the propulsive force in the forward travel direction (anteroposterior component) applied by the right outboard motor 301 can be cancelled. Thus, only a clockwise moment about the rotational center 20 acts on the hull 100, which allows the hull 100 to pivot clockwise with no substantial displacement. In more detail, a moment is applied to the hull 100 by the propulsive force of the right outboard motor 301 in the forward travel direction with the movement of the hull 100 being restricted by the left outboard motor 302. This results in the hull 100 pivoting such that its stern moves leftward.

The clockwise pivoting can thus be realized in which the stern of the hull 100 moves leftward. This facilitates, for example, docking on a docking target 30 such as a quay.

Repeating the operation (leftward movement of the stern) shown in FIGS. 12, 12A, and 12B and the operation (leftward movement of the stern) shown in FIGS. 13, 13A, and 13B alternately allows the hull 100 to move leftward. That is, when the left operation lever 102*b* is kept in the neutral position, the stern can move leftward by operating the right operation lever 102*a* to the forward drive side. The stern can also move leftward by operating the right operation lever 102*a* to the reverse drive side.

Figure 14A:
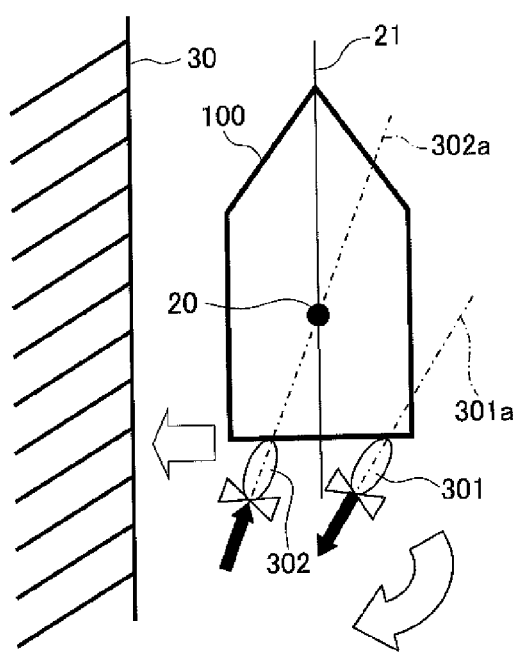
FIGS. 14A and 14B show another operation example when the right operation lever is on the reverse drive side and the left operation lever is in the neutral position in the assisted marine vessel maneuvering mode.
Figure 14B:
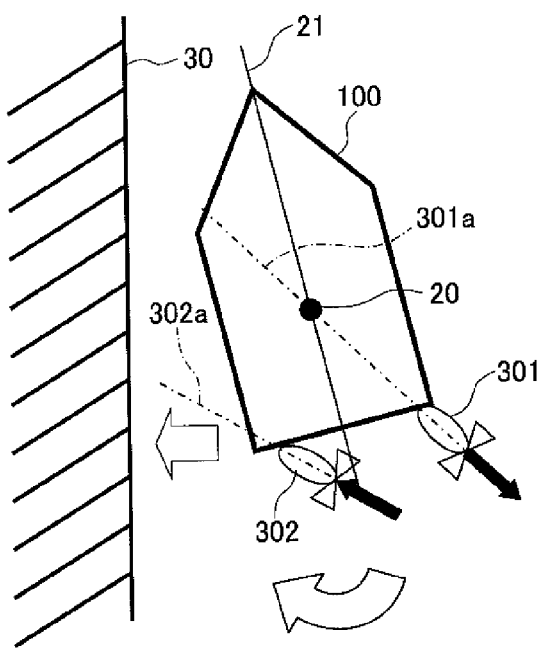

FIGS. 14A and 14B show another operation example when the right operation lever 102*a* is on the reverse drive side and the left operation lever 102*b* is in the neutral position (see FIG. 13) in the assisted marine vessel maneuvering mode.

FIG. 14A shows the state where the steering angle of the right outboard motor 301 is made smaller than that in the basic posture to be a negative value and its propulsive force is directed backward along the straight line 301*a* that passes on the right of the rotational center 20 of the hull 100. The left outboard motor 302 is in the basic posture. In this operation example, the propulsive force of the right outboard motor 301 follows the straight line 301*a*, which is rotated further clockwise relative to the straight line 302*a* that the propulsive force of the left outboard motor 302 follows. This causes the propulsive force of the right outboard motor 301 to apply a larger moment to the hull 100. The hull ECU 104 sets the target steering angle of the right outboard motor 301 to a negative value. The hull ECU 104 also sets the target shift state of the right outboard motor 301 to the reverse drive state and the target throttle opening degree (target engine speed) of the right outboard motor 301 to a value corresponding to the lever position difference ΔL. This causes the propulsive force of the right outboard motor 301 to apply a (clockwise) moment about the rotational center 20 to the hull 100.

It is, however, noted that the propulsive force of the right outboard motor 301 also acts as a propulsive force (anteroposterior component) in the reverse travel direction of the hull 100. Hence, the hull ECU 104 controls the left outboard motor 302 to generate a propulsive force in the forward travel direction. More specifically, the hull ECU 104 sets the target steering angle of the left outboard motor 302 to a value corresponding to the basic posture and the target shift state of the left outboard motor 302 to the forward drive state. The hull ECU 104 also sets the target throttle opening degree (target engine speed) of the left outboard motor 302 to a value with which the propulsive force in the reverse travel direction by the right outboard motor 301 can be cancelled. Thus, only a clockwise moment about the rotational center 20 acts on the hull 100, which allows the hull 100 to pivot with no substantial displacement so that its stern moves leftward.

FIG. 14B shows the state where the steering angle of the left outboard motor 302 is made greater than that in the basic posture to be a positive value and its propulsive force is directed forward along the straight line 302a that passes on the left of the rotational center 20 of the hull 100. The right outboard motor 302 is in the basic posture. In this operation example, the direction of the propulsive force of the left outboard motor 302 follows the straight line, which is rotated further counterclockwise relative to the straight line 301a that the propulsive force of the right outboard motor 301 follows. This causes the propulsive force of the left outboard motor 302 to apply a larger moment to the hull 100.

The hull ECU 104 sets the target steering angle of the left outboard motor 302 to a (positive) value greater than the steering angle in the basic posture. The hull ECU 104 also sets the target shift state of the left outboard motor 302 to the forward drive state and the target throttle opening degree (target engine speed) of the left outboard motor 302 to a value corresponding to the lever position difference ΔL. This causes the propulsive force of the left outboard motor 302 to apply a (clockwise) moment about the rotational center 20 to the hull 100.

It is, however, noted that the propulsive force of the left outboard motor 302 also acts as a propulsive force (anteroposterior component) in the forward travel direction of the hull 100. Hence, the hull ECU 104 controls the right outboard motor 301 to generate a propulsive force in the reverse travel direction. More specifically, the hull ECU 104 sets the target steering angle of the right outboard motor 301 to a value corresponding to the basic posture and the target shift state of the right outboard motor 301 to the reverse drive state. The hull ECU 104 also sets the target throttle opening degree (target engine speed) of the right outboard motor 301 to a value with which the propulsive force in the forward travel direction by the left outboard motor 302 can be cancelled. Thus, only a clockwise moment about the rotational center 20 acts on the hull 100, which allows the hull 100 to pivot with no substantial displacement so that the stern of the hull 100 moves leftward.

Although FIGS. 12 to 14B illustrate the operations for counterclockwise pivoting of the hull 100, the same applies to operations for clockwise pivoting of the hull 100. In this case, the operations of the right and left operation levers 102a and 102b replace each other. Accordingly, the operations of the right and left outboard motors 301 and 302 also replace each other.

Figure 15:
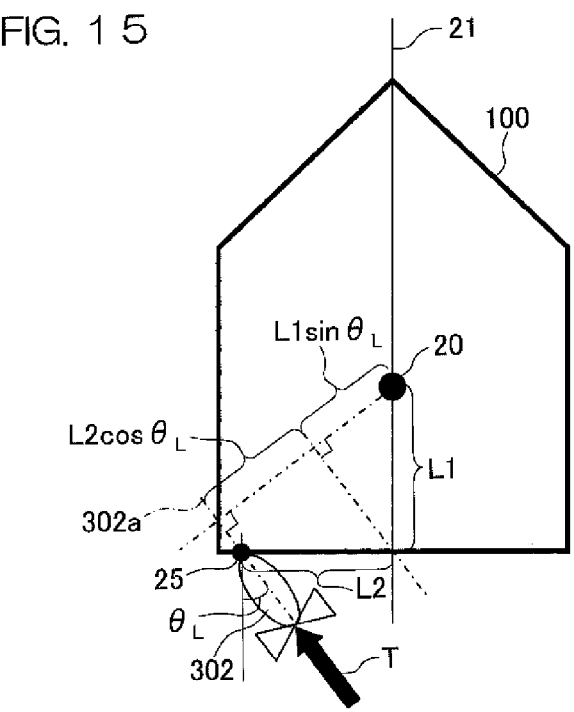
FIG. 15 illustrates a moment applied by the left outboard motor to the hull.

FIG. 15 illustrates a moment applied by the left outboard motor 302 to the hull 100. The distance from the rotational center 20 of the hull 100 to the steering axis 25 of the left outboard motor 302 along the longitudinal direction of the hull 100 (along the hull centerline 21) is defined as L1. Further, the distance from the rotational center 20 of the hull 100 to the steering axis 25 of the left outboard motor 302 along the lateral direction of the hull 100 (perpendicular to the hull centerline 21 in a plan view) is defined as L2. Further, the propulsive force of the left outboard motor 302 is defined as $T_L$. The steering angle of the left outboard motor 302 is then defined as $\theta_L$. In this case, the moment $M_L$ about the rotational center 20 of the hull 100 is expressed as follows:

$$M_L = T_L \cdot (L1 \cdot \sin \theta_L + L2 \cdot \cos \theta_L).$$

The moment $M_R$ applied by the propulsive force of the right outboard motor 301 to the hull 100 can also be obtained in the same manner. Summing these moments provides the moment M ($=M_R+M_L$) applied to the hull 100. Accordingly, in the assisted marine vessel maneuvering mode, the direction of the propulsive force of the right or left outboard motor 301 or 302 may not necessarily follow a straight line that passes through the rotational center 20. However, the operation in this case is complicated. Therefore, in order to simplify the operation, it is preferred that in the assisted marine vessel maneuvering mode, the direction of the propulsive force of one outboard motor follows a straight line that passes through the rotational center 20 of the hull 100 so that the moment $M_L$ or $M_R$ generated by the one outboard motor is zero.

Figure 16:
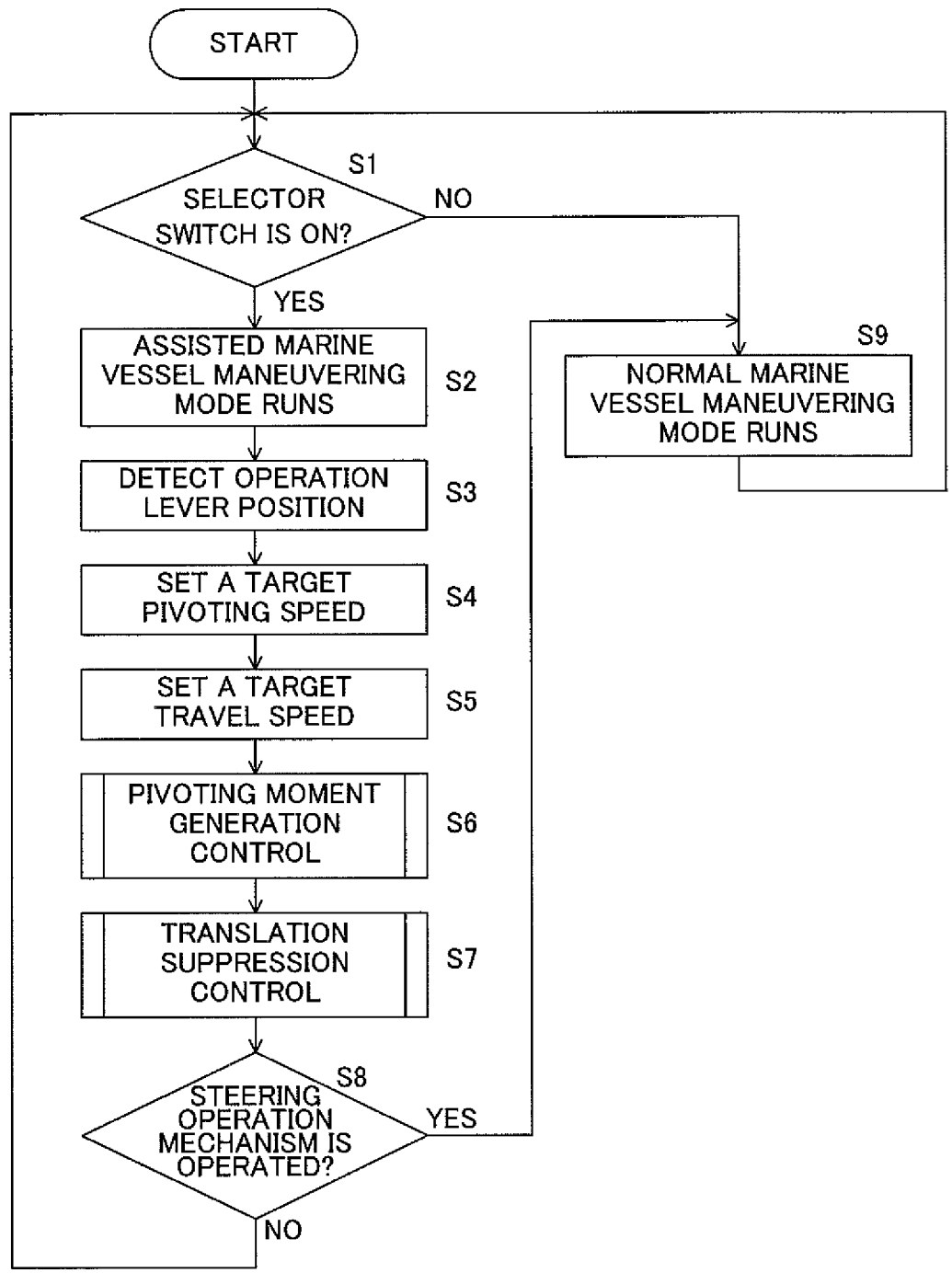
FIG. 16 is a flow chart illustrating the processing in a hull ECU.

FIG. 16 is a flow chart illustrating the processing in the hull ECU 104. In Step S1, the hull ECU 104 determines whether or not the selector switch 105 is ON. If the selector switch 105 is OFF, the routine goes to Step S9 and the control under the normal marine vessel maneuvering mode is performed. On the other hand, if the selector switch 105 is ON, the control under the assisted marine vessel maneuvering mode is performed in Step S2.

In the normal marine vessel maneuvering mode, the hull ECU 104 determines the shift states and throttle opening degrees of the right and left outboard motors 301 and 302 based on positional information of the operation levers detected by the lever position sensors 102c and 102d. These determined shift states and throttle opening degrees are sent to the outboard motor ECUs 308. The outboard motor ECUs 308 control the motors 303a and 305a based on the received shift states and throttle opening degrees to drive the throttle valve 303b and the forward-reverse switching mechanism 305. The hull ECU 104 also determines the steering angles of the right and left outboard motors 301 and 302 based on an operation angle detected by the operation angle sensor 103a, and sends the determined steering angle data to the steering ECUs 201c and 202c. The steering ECUs 201c and 202c drive the motors 201a and 202a in the respective right and left steering units 201 and 202 to make actual steering angles detected by the respective actual steering angle sensors 201b and 202b equal to the received steering angles.

On the other hand, in the assisted marine vessel maneuvering mode, the lever position sensors 102c and 102d detect the positions of the respective operation levers (right operation lever 102a and left operation lever 102b) in Step S3. The positional information of the operation levers is sent from the lever position sensors 102c and 102d to the hull ECU 104. Then, in Step S4, the hull ECU 104 sets a target pivoting speed based on the received positional information of the operation levers. That is, the hull ECU 104 sets the target pivoting speed according to the lever position difference ΔL. In Step S5, the hull ECU 104 further sets a target travel speed based on the positional information of the operation levers 102a and 102b. That is, when the operation levers 102a and 102b are on the same side with respect to the neutral position, the hull ECU 104 sets the target travel speed according to the position (minimum displacement position Lmin) of one of the operation levers having a smaller amount of displacement with respect to the neutral position. When the operation levers 102a and 102b are on opposite sides with respect to the neutral position, the hull ECU 104 sets the target travel speed to zero, as described above.

Next, the hull ECU 104 performs pivoting moment generation control to apply a moment for achieving the obtained target pivoting speed to the hull 100 (Step S6). The hull ECU 104 further performs translation suppression control to suppress the translation of the hull 100 so that the hull 100 travels at the target travel speed (the hull 100 stops if the target travel speed is zero) (Step S7).

In Step S8, the hull ECU 104 also determines whether or not the steering operation mechanism 103 is operated based on a detection result from the operation angle sensor 103a. If the steering operation mechanism 103 is rotated by a predetermined angle or more, the hull ECU 104 determines that the steering operation mechanism 103 is operated by the operator, and the routine proceeds to Step S9 to switch to the control under the normal marine vessel maneuvering mode. If the steering operation mechanism 103 is not rotated by the predetermined angle or more, the hull ECU 104 determines that the steering operation mechanism 103 is not operated by the operator, and the routine returns to Step S1. Steps S1 to S9 will thereafter be repeated.

Figure 17:
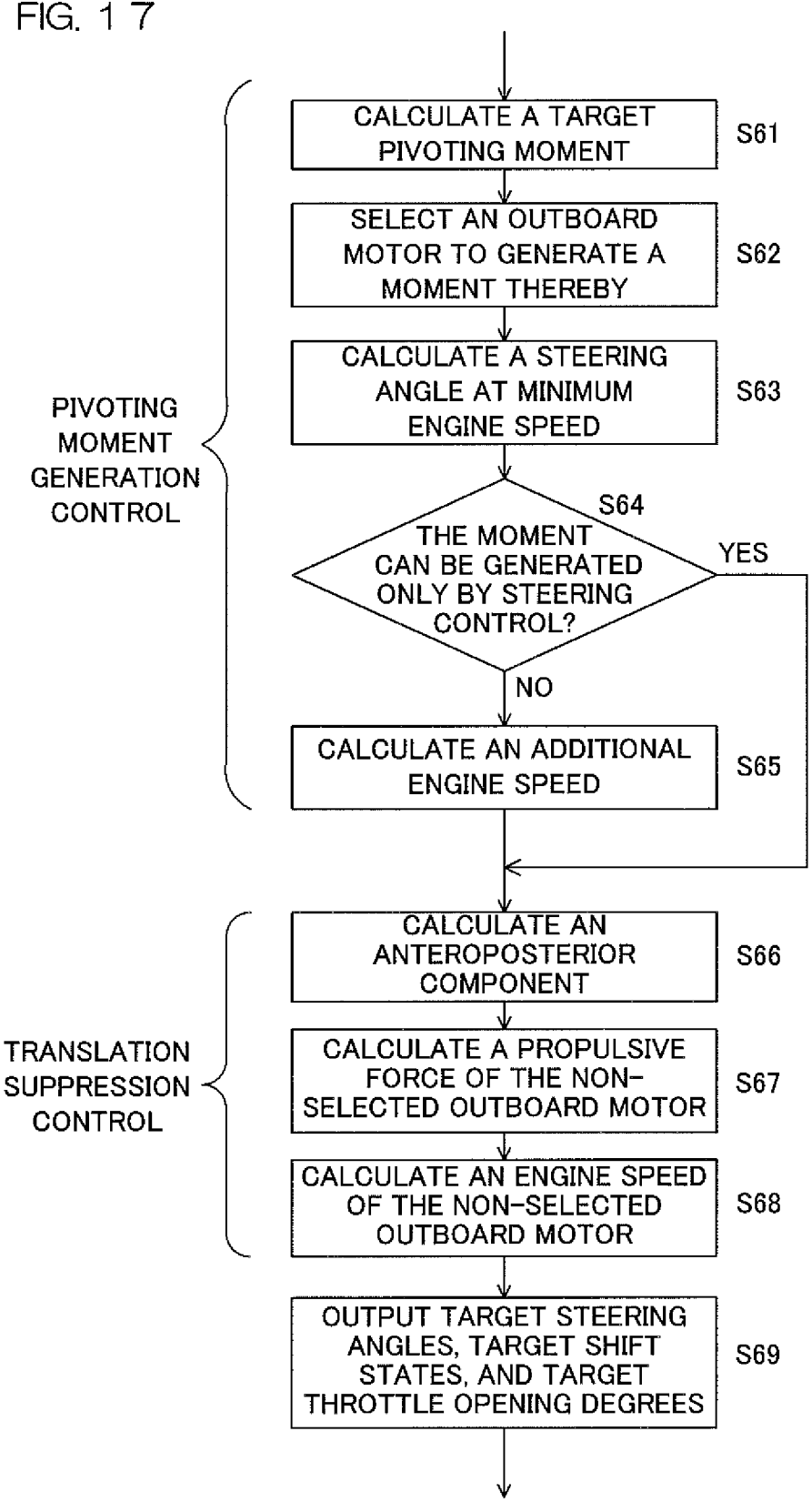
FIG. 17 is a flow chart illustrating pivoting moment generation control and translation suppression control (Steps S6 and S7 in FIG. 16) in detail.

FIG. 17 is a flow chart illustrating pivoting moment generation control and translation suppression control (Steps S6 and S7 in FIG. 16) in detail. The pivoting moment generation control includes calculation of a target pivoting moment (Step S61). The hull ECU 104 calculates a target pivoting moment required to achieve the target pivoting speed that is obtained based on the lever position difference ΔL. This processing may include reading a target moment corresponding to the target pivoting speed out of a prepared map. The map may be stored in a memory unit 104M of the hull ECU 104 in advance (see FIG. 5).

The hull ECU 104 selects one outboard motor (right outboard motor 301 or left outboard motor 302) to generate a moment thereby based on the calculated target pivoting moment (Step S62). The selected and non-selected outboard motors will hereinafter be referred to, respectively, as "selected outboard motor" and "non-selected outboard motor." The steering angle of the non-selected outboard motor will be controlled such that its propulsive force follows a straight line that passes through the rotational center of the hull 100. That is, in this processing example, the propulsive force of the non-selected outboard motor hardly contributes to the generation of the moment.

The hull ECU 104 calculates a steering angle of the selected outboard motor required to achieve the target pivoting moment when the selected outboard motor is driven at a minimum engine speed (Step S63). The minimum engine speed is an engine speed to be set when the operation levers 102a and 102b are operated to their shift-in positions. The shift-in position is a position at which the shift state switches from the neutral to the forward or reverse drive state when the operation lever 102a or 102b is operated forward or backward from the neutral position. The engine speed at the shift-in position may be called trawl speed. In general, the minimum engine speed belongs to a speed range from the idle speed to the trawl speed. For the purpose of internal arithmetic processing in the hull ECU 104, the minimum engine speed is expressed with a positive sign when the shift state is in the forward drive state, and is expressed with a negative sign when the shift state is in the reverse drive state.

The hull ECU 104 compares the absolute value of the calculated steering angle with the maximum absolute steering angle (e.g., about 25 degrees) of each outboard motor to determine if it is possible to generate the target pivoting moment only by steering control (Step S64). If it is not possible to generate the target pivoting moment even at the maximum absolute steering angle, the hull ECU 104 further calculates an engine speed to be added (additional engine speed) (Step S65). The additional engine speed is positive when the target shift state is in the forward drive state, while it is negative when the target shift state is in the reverse drive state.

The additional engine speed is an engine speed to be added to the minimum engine speed to compensate for a shortage in the propulsive force generated at the minimum engine speed. If it is possible to generate the target pivoting moment at an absolute steering angle equal to or smaller than the maximum absolute steering angle, the calculation of the additional engine speed (in Step S65) is omitted. The target engine speed and target steering angle of the selected outboard motor are thus set.

The translation suppression control includes calculation of an anteroposterior component of the propulsive force generated by the selected outboard motor (Step S66). The anteroposterior component is a component of the propulsive force generated by the selected outboard motor in the longitudinal direction of the hull 100. The hull ECU 104 calculates an anteroposterior component (orthogonal projection of the propulsive force to the hull centerline 21) based on the propulsive force generated by the selected outboard motor and the steering angle of the selected outboard motor. The hull ECU 104 further calculates a propulsive force to be generated by the non-selected outboard motor with which the resultant force of the anteroposterior components of the selected and non-selected outboard motors corresponds to the target travel speed (Step S67). If the target travel speed is zero, the propulsive force to be generated by the non-selected outboard motor is to be calculated to cancel the anteroposterior component of the selected outboard motor. Based on this calculated propulsive force, the target engine speed of the non-selected outboard motor is calculated (Step S68). The target steering angle of the non-selected outboard motor is set such that the direction of the propulsive force of the non-selected outboard motor follows a straight line that passes through the rotational center of the hull 100.

The hull ECU 104 transmits the target steering angles of the selected and non-selected outboard motors to the steering ECUs 201c and 202c via the LAN 10. The hull ECU 104 also transmits target shift states and target throttle opening degrees corresponding to the target engine speeds of the selected and non-selected outboard motors to the outboard motor ECUs 308, 308 via the LAN 10 (Step S69). The target shift state is in the forward drive state when the target engine speed is positive, and is in the reverse drive state when the target engine speed is negative. The steering ECUs 201c and 202c set the steering angles of the outboard motors 301 and 302 to their respective target steering angles. The outboard motor ECUs 308, 308 set the shift states and throttle opening degrees of the outboard motors 301 and 302 to their respective target values.

Figure 18:
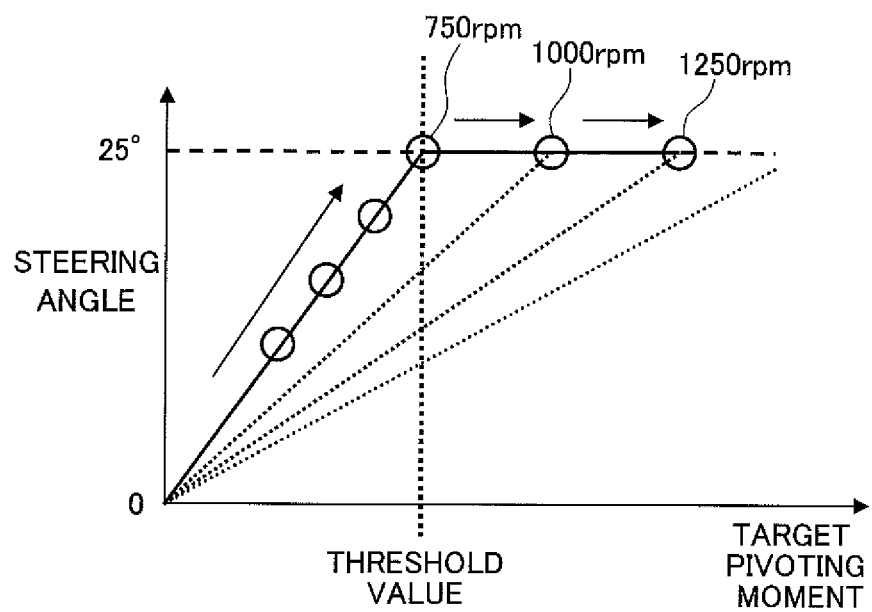
FIG. 18 is a graph illustrating an example of the relationship between the target pivoting moment and the steering angle of each outboard motor.

FIG. 18 is a graph illustrating an example of the relationship between the target pivoting moment and the steering angle of each outboard motor. The hull ECU 104 performs the processing of Steps S63 and S64 in FIG. 17 according to, for example, the features shown in FIG. 18.

For example, the minimum engine speed preferably is about 750 rpm. Also, the maximum absolute steering angle of each outboard motor in one direction preferably is about 25 degrees. The greater the steering angle of each outboard motor, the larger the moment can be applied to the hull 100. However, if the minimum engine speed is retained, the moment at the maximum absolute steering angle is an upper limit. Hence, for a target pivoting moment over a threshold value corresponding to the minimum engine speed and the maximum absolute steering angle, an additional engine speed is set to increase the propulsive force. That is, the target steering angle is set to a value corresponding to the maximum absolute steering angle, and the engine speed and therefore the propulsive force is increased to achieve the target pivoting moment.

If the target pivoting moment is equal to or smaller than the threshold value, the target pivoting moment can be achieved by increasing the engine speed instead of turning the outboard motor to its maximum absolute steering angle. This feature is shown by a phantom line in FIG. 18. In this case, however, the anteroposterior component of the selected outboard motor increases with the increase in the engine speed. It is therefore necessary to increase the engine speed of the non-selected outboard motor to cancel the anteroposterior component. Consequently, from the viewpoint of energy savings, it is preferable to achieve the target pivoting moment, if possible at the minimum engine speed, by changing the steering angle at the minimum engine speed.

In the assisted marine vessel maneuvering mode, not only the shift states and propulsive forces but also the steering angles of the right and left outboard motors 301 and 302 are thus controlled based on detection results from the two lever position sensors 102*c* and 102*d*. More specifically, the target pivoting speed and target travel speed are set according to the operational positions of the right and left operation levers 102*a* and 102*b*, and accordingly the shift states, propulsive forces (engine speeds), and steering angles of the right and left outboard motors 301 and 302 are controlled. This allows the propulsive forces of the outboard motors 300 to act effectively on the hull 100. This also allows the hull 100 to have a smaller turning radius and the behavior of the hull 100 to be changed quickly, whereby the movement of the marine vessel can be controlled finely. In addition, since the marine vessel can be controlled only by operating the operation levers (right operation lever 102*a* and left operation lever 102*b*), there is no need to operate the steering operation mechanism 103. It is therefore possible to improve the operability when finely controlling the movement of the marine vessel. Since the marine vessel can be controlled only by operating the operation levers, there is also no need to provide another operation system, such as a cross-shaped key, separately from the operation levers. This can prevent the marine vessel propulsion system from having a complex structure, and no complicated operations are required.

Also, in the assisted marine vessel maneuvering mode, the hull 100 pivots counterclockwise when the right operation lever 102*a* is positioned anterior to the left operation lever 102*b*, while pivoting clockwise when the left operation lever 102*b* is positioned anterior to the right operation lever 102*a*. That is, the shift states, engine speeds, and steering angles of the outboard motors 301 and 302 are controlled to realize these pivoting behaviors. In addition, the target pivoting speed is set according to the lever position difference ΔL between the operation levers. Therefore, the relationship with regard to the positional relationship between the operation levers 102*a* and 102*b* and the pivoting behavior of the hull 100 is similar to that in the normal marine vessel maneuvering mode. This allows the operator to easily imagine the behavior of the marine vessel according to the operation of the operation levers.

Further, in the assisted marine vessel maneuvering mode, when the right and left operation levers 102*a* and 102*b* are on the same side with respect to the neutral position, the outboard motors 301 and 302 are controlled such that the hull 100 drives in the direction in which the levers are operated. In this case, the target travel speed is further set according to the position of one of the operation levers having a smaller amount of displacement with respect to the neutral position. Therefore, the relationship between the operational positions of the operation levers 102*a* and 102*b* and the travel speed of the hull 100 is also similar to that in the normal marine vessel maneuvering mode. This allows the operator to easily imagine the behavior of the marine vessel according to the operation of the operation levers.

Thus, in the assisted marine vessel maneuvering mode, the operator can set the target pivoting speed and target travel speed through an intuitive operation.

When the right and left operation levers 102*a* and 102*b* are on opposite sides with respect to the neutral position, the target travel speed is set to zero, so that the hull 100 pivots with no substantial displacement. This allows the pivoting behavior corresponding to the operator's own intentions to be realized by operating only the operation levers in the same manner as in the normal marine vessel maneuvering mode.

Figure 19:
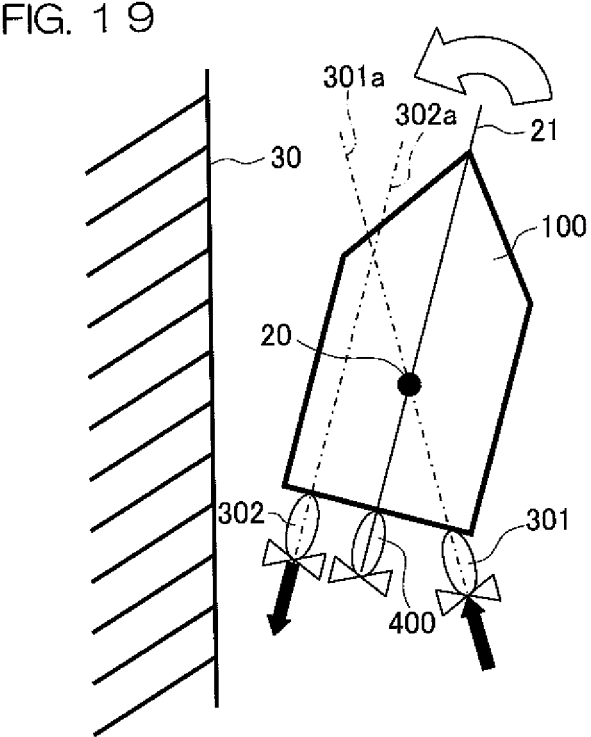
FIG. 19 is a schematic plan view of a marine vessel in which three outboard motors are mounted on a hull.

FIG. 19 is a schematic plan view of a marine vessel in which three outboard motors are mounted on a hull 100. In this marine vessel, a right outboard motor 301, a left outboard motor 302, and a center outboard motor 400 are mounted at the stern of the hull 100. For example, in the assisted marine vessel maneuvering mode, the steering angle and shift state of the center outboard motor 400 are controlled, respectively, to be zero degrees and the neutral state. The right and left outboard motors 301 and 302 are controlled in the same manner as in the above-described marine vessel having two outboard motors. In this assisted marine vessel maneuvering mode, the behavior of the marine vessel is the same as that of the above-described marine vessel having two outboard motors. It is noted that FIG. 19 shows an operation example when the right operation lever 102*a* is positioned anterior to the neutral position and the left operation lever 102*b* is in the neutral position (see FIG. 12).

Figure 20:
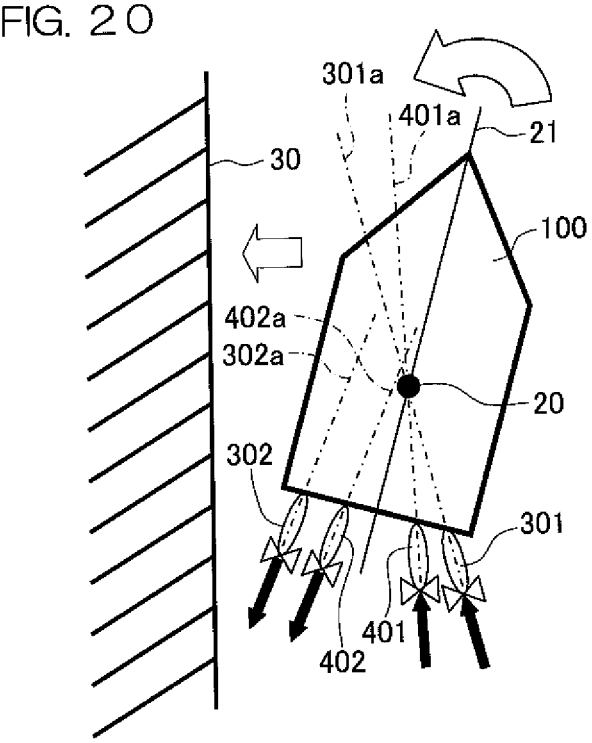
FIG. 20 is a schematic plan view of a marine vessel in which four outboard motors are mounted on a hull.

FIG. 20 is a schematic plan view of a marine vessel in which four outboard motors 300 are mounted on a hull 100. In this marine vessel, a right outboard motor 301, a left outboard motor 302, a right-center outboard motor 401, and a left-center outboard motor 402 are mounted at the stern of the hull 100. The right outboard motor 301 and the right-center outboard motor 401 are arranged on the right of the centerline 21 of the hull 100 to form a right outboard motor group. The right outboard motor 301 is arranged in the rightmost position. The right-center outboard motor 401 is arranged nearer the centerline 21 than the right outboard motor 301. The left outboard motor 302 and the left-center outboard motor 402 are arranged on the left of the centerline 21 of the hull 100 to form a left outboard motor group. The left outboard motor 302 is arranged in the leftmost position. The left-center outboard motor 402 is arranged nearer the centerline 21 than the left outboard motor 302.

In the assisted marine vessel maneuvering mode, the right and right-center outboard motors 301 and 401, which form the right outboard motor group, are controlled in the same manner as the right outboard motor 301 in the above-described marine vessel having two outboard motors. Similarly, in the assisted marine vessel maneuvering mode, the left and left-center outboard motors 302 and 402, which form the left outboard motor group, are controlled in the same manner as the left outboard motor 302 in the above-described marine vessel having two outboard motors. That is, the right and right-center outboard motors 301 and 401 correspond to a "first propulsion device" according to a preferred embodiment of the present invention, and the left and left-center outboard motors 302 and 402 correspond to a "second propulsion device" according to a preferred embodiment of the present invention.

Next will be described an operation example when, for example, the right operation lever 102*a* is positioned anterior to the neutral position and the left operation lever 102b is in the neutral position (see FIG. 12). The shift states of the right and right-center outboard motors 301 and 401, which form the right outboard motor group, are controlled to the forward drive state. The steering angles of the right and right-center outboard motors 301 and 401 are also controlled such that the directions of their propulsive forces follow respective straight lines 301a and 401a that pass through the rotational center 20 of the hull 100. On the other hand, the shift states of the left and left-center outboard motors 302 and 402, which form the left outboard motor group, are controlled to the reverse drive state. The left and left-center outboard motors 302 and 402 are also controlled to have the same steering angle. This steering angle is set such that the directions of the propulsive forces do not include the rotational center 20 of the hull 100. More specifically, the propulsive forces of the left and left-center outboard motors 302 and 402 act backward along straight lines 302a and 402a that pass on the left of the rotational center 20 of the hull 100. This causes the hull 100 to be applied with a counterclockwise moment and to pivot so that its stern moves leftward.

The arrangement of the first preferred embodiment can thus be applied easily to marine vessels including three or more outboard motors.

Second Preferred Embodiment

In a second preferred embodiment of the present invention, the control under the assisted marine vessel maneuvering mode is different from that in the above-described first preferred embodiment. Hence, the second preferred embodiment will be described by referring again to FIGS. 1 to 5 and redundant descriptions will be omitted.

Figure 21:
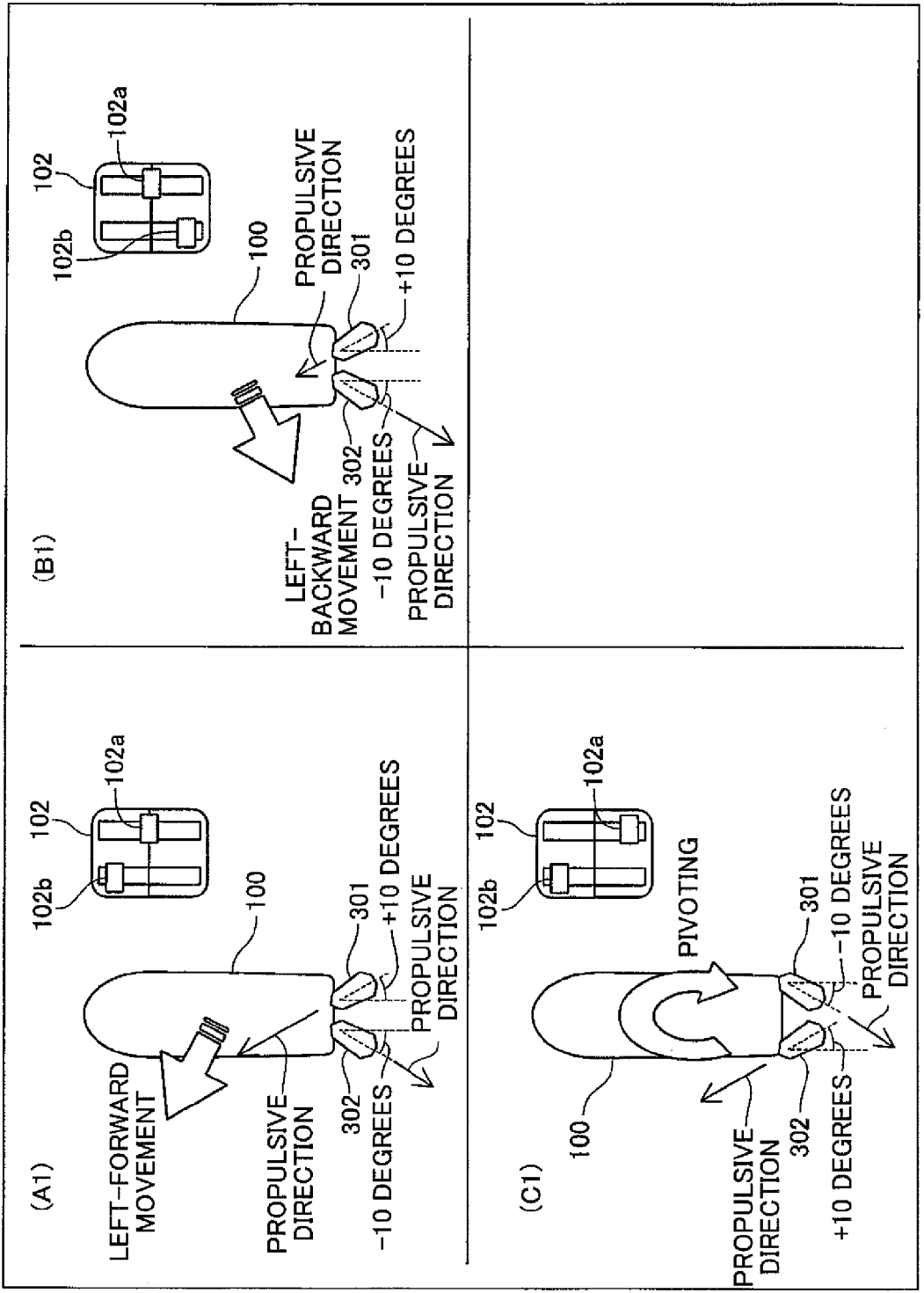
FIG. 21 illustrates steering angle control when a marine vessel propulsion system according to a second preferred embodiment of the present invention is in an assisted marine vessel maneuvering mode.

The control of the marine vessel propulsion system according to the second preferred embodiment under the assisted marine vessel maneuvering mode will be described with reference to FIGS. 21 and 22. It is noted that the "propulsive direction" indicated by the arrows in FIG. 21 is a direction of a propulsive force applied to the hull 100 by the right and left outboard motors 301 and 302. The length of each arrow represents the magnitude of a propulsive force by the right and left outboard motors 301 and 302.

In the assisted marine vessel maneuvering mode, the steering angles, shift states, and throttle opening degrees of the respective outboard motors 300 (right outboard motor 301 and left outboard motor 302) are controlled such that the hull exhibits a behavior pattern corresponding to the positional relationship between the operation levers. That is, the steering angles, shift states, and throttle opening degrees of the respective outboard motors 300 (right outboard motor 301 and left outboard motor 302) with which the hull 100 exhibits a predetermined behavior pattern are preset and stored in the hull ECU 104 correspondingly to the positional relationship between the operation levers. Such configuration information is stored in the memory unit 104M included in the hull ECU 104 (see FIG. 5). FIG. 22 shows configuration information stored in the memory unit 104M (where throttle opening degrees are not shown). The positional relationship between the operation levers includes the position of the right operation lever 102a, the position of the left operation lever 102b, and the positions of the right and left operation levers 102a and 102b relative to each other. The hull ECU 104 acquires the positional relationship between the operation levers based on detection results from the lever position sensors 102c and 102d and reads configuration information (steering angles, shift states, and throttle opening degrees) corresponding to the positional relationship out of the memory unit 104M. This readout configuration information is transmitted to the steering ECUs 201c and 202c and the outboard motor ECUs 308 via the LAN 10. Then, the motors 201a and 202a in the respective right and left steering units 201 and 202 and the outboard motors 300 (right outboard motor 301 and left outboard motor 302) are controlled such that the hull 100 exhibits a behavior pattern corresponding to the positional relationship.

In the assisted marine vessel maneuvering mode, the steering angles, shift states, and throttle opening degrees of the outboard motors 300 are controlled based on the positional relationship between the two operation levers. For this reason, as shown in FIG. 22, the position of the right operation lever 102a (forward drive position, reverse drive position, or neutral position) does not necessarily correspond to the shift state of the right outboard motor 301 (forward drive (F), reverse drive (R), or neutral (N)), unlike the normal marine vessel maneuvering mode. Also, the position of the right operation lever 102a does not also necessarily correspond to the throttle opening degree of the right outboard motor 301, unlike the normal marine vessel maneuvering mode. Similarly, the position of the left operation lever 102b does not necessarily correspond to the shift state and/or throttle opening degree of the left outboard motor 302. The control will hereinafter be described in detail.

When the shift state of the right outboard motor 301 corresponding to the position of the right operation lever 102a is the same as the shift state of the left outboard motor 302 corresponding to the position of the left operation lever 102b, the operation is the same as in the normal marine vessel maneuvering mode. That is, the steering angle of the outboard motors 300 is not changed to be in the neutral position, and only the shift states and throttle opening degrees of the outboard motors 300 are changed. Specifically, when both the right and left operation levers 102a and 102b are in the neutral position, the shift states of the right and left outboard motors 301 and 302 are both controlled to be neutral (N). In this case, the throttle opening degrees of the right and left outboard motors 301 and 302 are both controlled to be in the fully-closed state (with an opening degree of 0%). When both the right and left operation levers 102a and 102b are in the forward or reverse drive position, the shift states of the right and left outboard motors 301 and 302 are both controlled to be forward drive (F) or reverse drive (R). Then, the right and left outboard motors 301 and 302 are controlled to have their respective throttle opening degrees (0 to 100%) that correspond to the amount of displacement of the respective operation levers with respect to the neutral position.

In the assisted marine vessel maneuvering mode, when the position of the right operation lever 102a (forward drive position, reverse drive position, or neutral position) is different from the position of the left operation lever 102b (forward drive position, reverse drive position, or neutral position), the control is different from that under the normal marine vessel maneuvering mode. That is, the steering angles, shift states, and throttle opening degrees of the outboard motors 300 are controlled such that the hull 100 exhibits a behavior pattern preset correspondingly to the positional relationship between the operation levers.

For example, as indicated by (A1) in FIGS. 21 and 22, when the right and left operation levers 102a and 102b are, respectively, in the neutral and forward drive positions, the operation runs as follows. The behavior of the hull 100 preset correspondingly to this positional relationship between the operation levers is a movement (translation) in the (left-forward) direction from the right operation lever 102a in the neutral position to the left operation lever 102b on the forward drive side. That is, the steering angles, shift states, and throttle opening degrees of the outboard motors 300 are controlled such that the hull 100 is translated left-forward. Translation means that the hull 100 moves without substantially pivoting.

In the case above, the steering angle of the right outboard motor 301 is changed to be about +10 degrees, for example, while the steering angle of the left outboard motor 302 is changed to be about −10 degrees, for example. That is, the steering angles of the outboard motors 300 are changed such that the rear end portions of the right and left outboard motors 301 and 302 are moved away from each other. In this case, the propulsive force vectors of the right and left outboard motors 301 and 302 are both directed to the rotational center of the hull 100. This causes the hull 100 to be translated with little pivoting. It is noted that the steering angle takes a positive value when the rear end portions (propellers 307) of the outboard motors 301 and 302 are turned rightward with respect to the longitudinal direction of the hull 100, while taking a negative value when turned leftward with respect to the longitudinal direction of the hull 100.

Although the right and left operation levers 102a and 102b are, respectively, in the neutral and forward drive positions, the shift states of the outboard motors 301 and 302 do not correspond to the positions. That is, the shift states of the right and left outboard motors 301 and 302 are controlled, respectively, to be forward drive (F) and reverse drive (R). Also, the throttle opening degrees of the right and left outboard motors 301 and 302 are also controlled to their respective predetermined preset values, regardless of the positions of the operation levers. In the behavior pattern (A1), the throttle opening degree of the right outboard motor 301 is controlled to be greater than that of the left outboard motor 302. In this case, the resultant force of the propulsive forces of the right and left outboard motors 301 and 302 causes the hull 100 to be translated left-forward.

As indicated by (A2) in FIG. 22, when the right and left operation levers 102a and 102b are, respectively, in the forward drive and neutral positions, the operation runs as follows. The behavior of the hull 100 preset correspondingly to this positional relationship between the operation levers is a movement (translation) in the (right-forward) direction from the left operation lever 102b in the neutral position to the right operation lever 102a on the forward drive side. That is, the steering angle of the right outboard motor 301 is changed to be about +10 degrees, for example, while the steering angle of the left outboard motor 302 is changed to be about −10 degrees, for example. Although the right and left operation levers 102a and 102b are, respectively, in the forward drive and neutral positions, the shift states of the right and left outboard motors 301 and 302 are controlled, respectively, to be reverse drive (R) and forward drive (F). In the behavior pattern (A2), the throttle opening degree of the right outboard motor 301 is controlled to be smaller than that of the left outboard motor 302. In this case, the resultant force of the propulsive forces of the right and left outboard motors 301 and 302 causes the hull 100 to be translated right-forward.

Also, as indicated by (B1) in FIGS. 21 and 22, when the right and left operation levers 102a and 102b are, respectively, in the neutral and reverse drive positions, the operation runs as follows. The behavior of the hull 100 preset correspondingly to this positional relationship between the operation levers is a movement (translation) in the (left-backward) direction from the right operation lever 102a in the neutral position to the left operation lever 102b on the reverse drive side. That is, the steering angles, shift states, and throttle opening degrees of the outboard motors 300 are controlled such that the hull 100 is translated left-backward.

In the case above, the steering angle of the right outboard motor 301 is changed to be about +10 degrees, for example, while the steering angle of the left outboard motor 302 is changed to be about −10 degrees, for example. Although the right and left operation levers 102a and 102b are, respectively, in the neutral and reverse drive positions, the shift states of the right and left outboard motors 301 and 302 are controlled, respectively, to be forward drive (F) and reverse drive (R). In the behavior pattern (B1), the throttle opening degree of the left outboard motor 302 is controlled to be greater than that of the right outboard motor 301. In this case, the resultant force of the propulsive forces of the right and left outboard motors 301 and 302 causes the hull 100 to be translated left-backward.

Further, as indicated by (B2) in FIG. 22, when the right and left operation levers 102a and 102b are, respectively, in the reverse drive and neutral positions, the operation runs as follows. The behavior of the hull 100 preset correspondingly to this positional relationship between the operation levers is a movement (translation) in the (right-backward) direction from the left operation lever 102b in the neutral position to the right operation lever 102a on the reverse drive side. That is, the steering angle of the right outboard motor 301 is changed to be about +10 degrees, for example, while the steering angle of the left outboard motor 302 is changed to be about −10 degrees, for example. Although the right and left operation levers 102a and 102b are, respectively, in the reverse drive and neutral positions, the shift states of the right and left outboard motors 301 and 302 are controlled, respectively, to be reverse drive (R) and forward drive (F). In the behavior pattern (B2), the throttle opening degree of the right outboard motor 301 is controlled to be greater than that of the left outboard motor 302. In this case, the resultant force of the propulsive forces of the right and left outboard motors 301 and 302 causes the hull 100 to be translated right-backward.

As indicated by (C1) in FIGS. 21 and 22, when the right and left operation levers 102a and 102b are, respectively, in the reverse and forward drive positions, the shift states of the right and left outboard motors 301 and 302 are controlled, respectively, to be reverse drive (R) and forward drive (F). In this case, the steering angle of the right outboard motor 301 is changed to be about −10 degrees, for example, while the steering angle of the left outboard motor 302 is changed to be about +10 degrees, for example, as indicated by (C1) in FIG. 22. That is, when the right and left operation levers 102a and 102b are, respectively, in the reverse and forward drive positions, the steering angles of the right and left outboard motors 301 and 302 are changed such that the rear end portions of the right and left outboard motors 301 and 302 are brought close to each other. Also, the shift states of the right and left outboard motors 301 and 302 are controlled, respectively, to be reverse drive (R) and forward drive (F) correspondingly to the position (reverse drive position) of the right operation lever 102a and the position (forward drive position) of the left operation lever 102b. Also, the throttle opening degrees of the right and left outboard motors 301 and 302 are also controlled to their respective predetermined preset values, regardless of the positions of the operation levers. In the behavior pattern (C1), the throttle opening degrees of the right and left outboard motors 301 and 302 are the same. However, since the thrust (propulsive force) when the shift state is in reverse drive (R) is smaller than that when the shift state is in forward drive (F), the throttle opening degree of the right outboard motor 301 may be set greater than that of the left outboard motor 302.

In the behavior pattern (C1), the steering angles, shift states, and throttle opening degrees of the outboard motors 300 are thus controlled such that the hull 100 is applied with a forward drive propulsive force on the left side and a reverse drive propulsive force on the right side, whereby the behavior of the hull 100 is a rightward pivoting motion about the stern of the hull 100. Since the steering angles of the right and left outboard motors 301 and 302 are controlled to follow the direction of the pivoting motion of the hull 100, the propulsive forces of the right and left outboard motors 301 and 302 are applied effectively in the pivoting direction of the hull 100.

Similarly, as indicated by (C2) in FIG. 22, when the right and left operation levers 102a and 102b are, respectively, in the forward and reverse drive positions, the steering angle of the right outboard motor 301 is changed to be about −10 degrees, for example, while the steering angle of the left outboard motor 302 is changed to be about +10 degrees, for example. The shift states of the right and left outboard motors 301 and 302 are controlled, respectively, to be forward drive (F) and reverse drive (R) correspondingly to the position (forward drive position) of the right operation lever 102a and the position (reverse drive position) of the left operation lever 102b. The throttle opening degrees of the right and left outboard motors 301 and 302 are also controlled to their respective predetermined preset values, regardless of the positions of the operation levers. In the behavior pattern (C2), the throttle opening degrees of the right and left outboard motors 301 and 302 are the same. However, since the thrust (propulsive force) when the shift state is in reverse drive (R) is smaller than that when the shift state is in forward drive (F), the throttle opening degree of the left outboard motor 302 may be set greater than that of the right outboard motor 301.

In the behavior pattern (C2), the hull 100 is applied with a reverse drive propulsive force on the left side and a forward drive propulsive force on the right side, whereby the behavior of the hull 100 is a leftward pivoting motion about the stern of the hull 100. Since the steering angles of the right and left outboard motors 301 and 302 are controlled to follow the direction of the pivoting motion of the hull 100, the propulsive forces of the right and left outboard motors 301 and 302 are applied effectively in the pivoting direction of the hull 100.

As described heretofore, when the right and left operation levers 102a and 102b are, respectively, in one and the other of the forward and reverse drive positions, the steering angles of the right and left outboard motors 301 and 302 are changed such that the rear end portions of the right and left outboard motors 301 and 302 are brought close to each other. The vector directions of the propulsive forces generated by the right and left outboard motors 300 do not include the rotational center of the hull 100 (that approximately coincides with the center of gravity of the hull 100, for example). Therefore, the propulsive forces generated by the right and left outboard motors 300 apply a moment about a vertical axis to the hull 100. This causes the hull 100 to pivot with little displacement.

It is noted that the behavior patterns (C1) and (C2) are examples of control when the two operation levers are, respectively, in the forward and reverse drive positions. The steering angles, shift states, and throttle opening degrees of the outboard motors 300 may be controlled such that the hull 100 exhibits a behavior other than the pivoting motions.

In the second preferred embodiment, the amount of change in the steering angle of each outboard motor 300 is preferably fixed at about 10 degrees, for example, regardless of the amount of displacement of the corresponding operation lever with respect to the neutral position (i.e., throttle opening degree). In the marine vessel propulsion system adopting two outboard motors 300, when the steering angles of the right and left outboard motors 301 and 302 are changed by, for example, about 13 degrees or more so that the rear end portions thereof are brought close to each other, the right and left outboard motors 301 and 302 interfere with each other. Accordingly, the amount of change in the steering angle of each outboard motor 300 is preferably set to about 12 degrees or less, for example.

Figure 23:
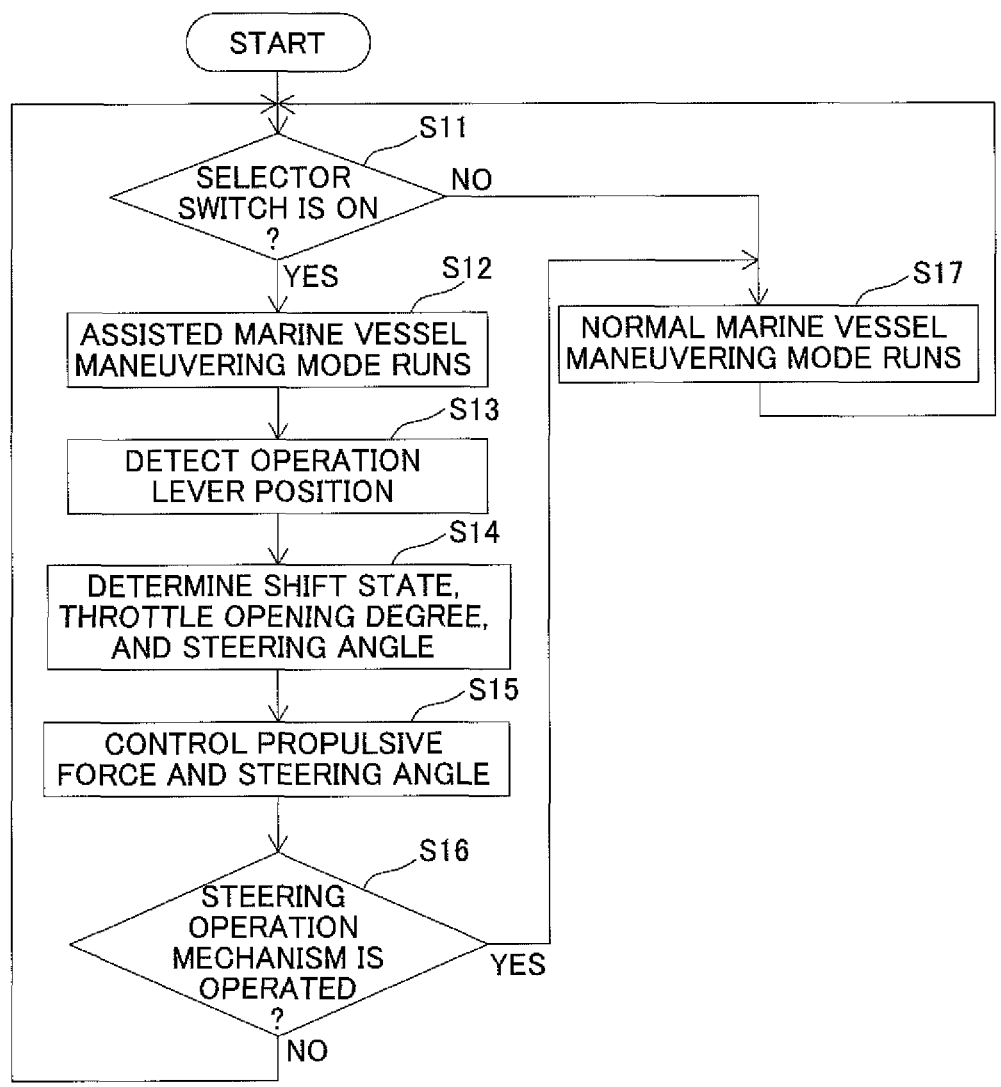
FIG. 23 is a flow chart illustrating the control of the marine vessel propulsion system according to the second preferred embodiment of the present invention.

Next will be described the operational control for the marine vessel propulsion system according to the second preferred embodiment with reference to FIGS. 22 and 23.

In Step S11, the hull ECU 104 determines whether or not the selector switch 105 is ON. If the selector switch 105 is OFF, the routine goes to Step S17 and the control under the normal marine vessel maneuvering mode is performed. On the other hand, if the selector switch 105 is ON, the control under the assisted marine vessel maneuvering mode is performed in Step S12.

In the normal marine vessel maneuvering mode, the hull ECU 104 determines the shift states and throttle opening degrees of the right and left outboard motors 301 and 302 based on positional information of the operation levers detected by the lever position sensors 102c and 102d. These determined shift states and throttle opening degrees are sent to the outboard motor ECUs 308. The outboard motor ECUs 308 control the motors 303a and 305a based on the received shift states and throttle opening degrees to drive the throttle valve 303b and the forward-reverse switching mechanism 305. The hull ECU 104 also determines the steering angles of the right and left outboard motors 301 and 302 based on an operation angle detected by the operation angle sensor 103a, and sends the determined steering angle data to the steering ECUs 201c and 202c. The steering ECUs 201c and 202c drive the motors 201a and 202a in the respective right and left steering units 201 and 202 to make actual steering angles detected by the respective actual steering angle sensors 201b and 202b equal to the received steering angles.

On the other hand, in the assisted marine vessel maneuvering mode, the lever position sensors 102c and 102d detect the positions of the respective operation levers (right operation lever 102a and left operation lever 102b) in Step S13. The positional information of the operation levers is sent from the lever position sensors 102c and 102d to the hull ECU 104. Then, in Step S14, the hull ECU 104 determines the shift states, throttle opening degrees, and steering angles of the right and left outboard motors 301 and 302 based on the received positional information of the operation levers and the relationship shown in FIG. 22.

Next, in Step S15, the hull ECU 104 sends the determined shift states and throttle opening degrees to the outboard motor ECUs 308 in the right and left outboard motors 301 and 302. The outboard motor ECUs 308 drive the motor 305a for the forward-reverse switching mechanism 305 and the motor 303a for the throttle valve 303b to achieve the received shift states and throttle opening degrees. The hull ECU 104 also sends the determined steering angles to the steering ECUs 201c and 202c in the respective right and left steering units 201 and 202. The steering ECUs 201c and 202c drive the motors 201a and 202a in the respective right and left steering units 201 and 202 to make actual steering angles detected by the respective actual steering angle sensors 201b and 202b equal to the received steering angles.

In Step S16, the hull ECU 104 determines whether or not the steering operation mechanism 103 is operated based on a detection result from the operation angle sensor 103a. If the steering operation mechanism 103 is rotated by a predetermined angle or more, the hull ECU 104 determines that the steering operation mechanism 103 is operated by the operator, and the routine proceeds to Step S17 to switch to the control under the normal marine vessel maneuvering mode. If the steering operation mechanism 103 is not rotated by the predetermined angle or more, the hull ECU 104 determines that the steering operation mechanism 103 is not operated by the operator, and the routine returns to Step S11. Steps S11 to S17 will thereafter be repeated.

In the assisted marine vessel maneuvering mode, the steering angles, shift states, and propulsive forces of the respective multiple outboard motors 300 are controlled such that the hull 100 exhibits a behavior pattern preset correspondingly to the positional relationship between the two operation levers (right operation lever 102a and left operation lever 102b), as described above. Therefore, the operator, if he/she wants the hull 100 to exhibit a predetermined behavior such as pivoting or lateral movement, is only required to operate the operation levers so as to be a positional relationship corresponding to the desired behavior. In response to this lever operation, the steering angles, shift states, and propulsive forces of the outboard motors 300 are controlled automatically to be appropriate to cause the hull 100 to exhibit the desired behavior. This arrangement allows the propulsive forces of the outboard motors 300 to be used effectively when the hull 100 pivots or moves laterally, for example. This allows the behavior (e.g., pivoting motion) of the hull 100 to be changed quickly and highly responsively. As a result, the movement of the marine vessel can be finely controlled.

In addition, since the marine vessel can be controlled only by operating the operation levers, there is no need to operate the steering operation mechanism 103. It is therefore possible to improve the operability when finely controlling the movement of the marine vessel. There is also no need to provide another operation system, such as a cross-shaped key, separately from the operation levers, which can prevent the marine vessel propulsion system from having a complex structure. Since there is no need to add another operation system, no complicated operations are required. Therefore, the second preferred embodiment can improve the operability when finely controlling the movement of the marine vessel while preventing the marine vessel propulsion system from having a complex structure.

Also, in the second preferred embodiment, the positions of the operation levers 102a and 102b do not necessarily correspond to the shift states of the respective outboard motors 300 in the assisted marine vessel maneuvering mode, as described above. That is, the steering angles, shift states, and propulsive forces of the respective multiple outboard motors 300 are controlled such that the hull 100 exhibits a behavior pattern corresponding to the positional relationship between the operation levers 102a and 102b. In the assisted marine vessel maneuvering mode, the operator may operate the operation levers so as to be a positional relationship corresponding to a behavior into which he/she wants to bring the hull 100 without regard to the shift states of the outboard motors 300. This allows the hull 100 to exhibit the desired behavior easily.

Further, in the second preferred embodiment, when the shift state corresponding to the position of the right operation lever 102a is the same as the shift state corresponding to the position of the left operation lever 102b in the assisted marine vessel maneuvering mode, the hull 100 moves straight (forward or backward). When the shift states are different from each other, the hull 100 exhibits a behavior pattern (other than straight drive) corresponding to the positional relationship between the right and left operation levers 102a and 102b. Since this behavior is similar to a behavior of the hull 100 through a normal operation of the operation levers, it is possible to provide the operator with an improved, more natural feeling.

Also, in the second preferred embodiment, when the right and left operation levers 102a and 102b are, respectively, in the neutral position and a position other than the neutral position (on the forward or reverse drive side) in the assisted marine vessel maneuvering mode, a characteristic operation is performed. That is, the steering angles, shift states, and propulsive forces of the respective outboard motors 300 are controlled such that the hull 100 moves in a direction corresponding to the direction from the position of the right operation lever 102a in the neutral position to the position of the left operation lever 102b in the position other than the neutral position. The operator operates the operation levers such that the direction of the straight line from the position of the right operation lever 102a in the neutral position to the position of the left operation lever 102b corresponds to the (left-forward or left-backward) direction in which he/she wants to move the hull 100. This allows the hull 100 to move in that direction.

The same operation is also performed when the right and left operation levers 102a and 102b are, respectively, in a position other than the neutral position (on the forward or reverse drive side) and the neutral position in the assisted marine vessel maneuvering mode. That is, the steering angles, shift states, and propulsive forces of the respective outboard motors 300 are controlled such that the hull 100 moves in a direction corresponding to the direction from the position of the left operation lever 102b in the neutral position to the position of the right operation lever 102a in the position other than the neutral position. The operator operates the operation levers such that the direction of the straight line from the position of the left operation lever 102b in the neutral position to the position of the right operation lever 102a corresponds to the direction in which he/she wants to move the hull 100. This allows the hull 100 to move in that (right-forward or right-backward) direction.

Even operators with a poor marine vessel maneuvering skill can thus control the marine vessel easily.

Furthermore, in the second preferred embodiment, when the right and left operation levers 102a and 102b are, respectively, in the forward and reverse drive positions in the assisted marine vessel maneuvering mode, the shift states of the right and left outboard motors 301 and 302 are controlled, respectively, to be the forward and reverse drive states. The steering angles of the right and left outboard motors 301 and 302 are further changed such that the rear end portions of the right and left outboard motors 301 and 302 are brought close to each other. Similarly, when the right and left operation levers 102a and 102b are, respectively, in the reverse and forward drive positions, the shift states of the right and left outboard motors 301 and 302 are controlled, respectively, to be the reverse and forward drive states. The steering angles of the right and left outboard motors 301 and 302 are further changed such that the rear end portions of the right and left outboard motors 301 and 302 are brought close to each other. This arrangement allows the propulsive forces of the right and left outboard motors 301 and 302 to act in a pivoting direction of the hull 100. The propulsive forces of the right and left outboard motors 301 and 302 consequently allow the hull 100 to rotate (pivot) quickly and highly responsively without being largely displaced (substantially with no displacement).

Moreover, in the second preferred embodiment, the selector switch 105 is arranged to switch control modes between the normal marine vessel maneuvering mode and the assisted marine vessel maneuvering mode, as described above. With this arrangement, the operator can run the normal marine vessel maneuvering mode and use the steering operation mechanism 103 for normal marine vessel maneuvering. On the other hand, the operator, when required to finely control the movement of the marine vessel (such as launching from and docking on shore), can run the assisted marine vessel maneuvering mode and use only the operation levers for maneuvering. This can improve the convenience for the operator.

Figure 24:
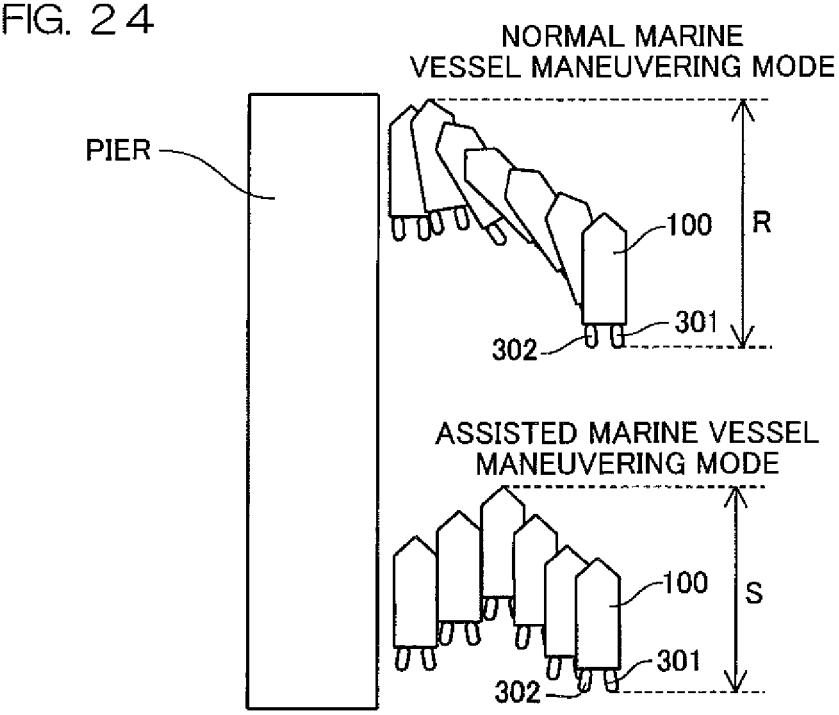
FIG. 24 illustrates advantageous effects of the marine vessel propulsion system according to the second preferred embodiment of the present invention.

The above-described advantageous effects of the marine vessel propulsion system according to the second preferred embodiment will hereinafter be described in more detail with reference to FIG. 24. In FIG. 24, the behavior of the hull 100 in the normal marine vessel maneuvering mode, in which the steering angles are not controlled according to the positions of the operation levers, is shown in a manner comparable with the behavior of the hull 100 in the assisted marine vessel maneuvering mode.

FIG. 24 shows the behavior of the hull 100 when brought alongside a pier under the assisted and normal marine vessel maneuvering modes. As shown in FIG. 24, in the normal marine vessel maneuvering mode, the hull 100 cannot be turned in a small radius, which requires a larger space R to bring the marine vessel alongside the pier. On the other hand, in the assisted marine vessel maneuvering mode, the hull 100 can be turned in a small radius, which requires only a smaller space S to bring the marine vessel alongside the pier.

Other Preferred Embodiments

The above-disclosed preferred embodiments of the present invention are to be considered in all aspects only as illustrative and not restrictive. The scope of the present invention is not defined by the above-described preferred embodiments, but rather by the claims appended hereto. Further, the present invention includes all the modifications within the meaning and scope equivalent to those defined by the appended claims.

For example, although the preferred embodiments above describe mainly the case where two operation levers are preferably used to steer two outboard motors, the present invention is not restricted thereto. Two or more operation levers may be used to steer four or more outboard motors, including the cases, for example, where two operation levers are used to steer four outboard motors (see FIG. 20) and where three operation levers are used to steer three outboard motors (see FIG. 19).

Although, the preferred embodiments above describe the case where outboard motors that generate a propulsive force by rotating a propeller with a driving force from an engine are preferably adopted, the present invention is not restricted thereto. That is, outboard motors and other propulsion devices may be adopted that generate a propulsive force by rotating a propeller with a driving force from an electric motor. Not only propulsion devices that generate a propulsive force by rotating a propeller but also propulsion devices (jet propulsion devices) that generate a propulsive force through jet drive in which water is jetted through an injection nozzle may be adopted.

Although, the preferred embodiments above describe the case where a marine vessel maneuvering operator preferably operates the selector switch to switch between the normal marine vessel maneuvering mode and the assisted marine vessel maneuvering mode, the present invention is not restricted thereto. That is, it may be arranged that the normal marine vessel maneuvering mode switches automatically to the assisted marine vessel maneuvering mode if predetermined conditions are met.

Although the second preferred embodiment above describes the case where the patterns (A1) and (A2) preferably correspond to lateral-forward movement, (B1) and (B2) to lateral-backward movement, and (C1) and (C2) to pivoting moment, the present invention is not restricted thereto. That is, the patterns (A1), (A2), (B1), (B2), (C1), and (C2) may be set correspondingly to other hull behaviors. The patterns (A1), (A2), (B1), (B2), (C1), and (C2) may correspond to, for example, lateral movement or turning motion.

Although the preferred embodiments above describe the case where the normal marine vessel maneuvering mode is preferably switchable to one assisted marine vessel maneuvering mode, the present invention is not restricted thereto. For example, multiple assisted marine vessel maneuvering modes having their respective different relationships with regard to the positional relationship between the operation levers and the behavior of the hull may be provided and the operator may select from among these multiple assisted marine vessel maneuvering modes.

Although the second preferred embodiment above describes the case where the amount of change in the steering angle of each outboard motor is preferably fixed to about 10 degrees, for example, the present invention is not restricted thereto. The steering angle may be changed to a value other than approximately 10 degrees.

Although the second preferred embodiment above describes the case where the amount of change in the steering angle of the right outboard motor 301 and the amount of change in the steering angle of the left outboard motor 302 are preferably both set to the same angle (e.g., about 10 degrees), the present invention is not restricted thereto. That is, the amount of change in the steering angle of the right outboard motor 301 may be different from the amount of change in the steering angle of the left outboard motor 302.

Although the second preferred embodiment above describes the case where when the shift state corresponding to the position of the right operation lever 102a is different from the shift state corresponding to the position of the left operation lever 102b, the steering angles, shift states, and throttle opening degrees of the outboard motors are preferably controlled such that the hull exhibits a behavior corresponding to the positional relationship between the operation levers, the present invention is not restricted thereto. For example, even when the shift states corresponding to the positions of the respective right and left operation levers 102a and 102b may be the same (e.g., both in the forward drive position), the positions of the right and left operation levers 102a and 102b may be different (i.e., the throttle opening degrees of the right and left outboard motors 301 and 302 may be different). In this case, the steering angles, shift states, and throttle opening degrees of the outboard motors may be changed such that the hull exhibits a behavior corresponding to the positional relationship between the right and left operation levers.

Also in the case above, the steering angles, shift states, and propulsive forces of the respective multiple outboard motors 300 may be controlled such that the hull 100 moves in a direction corresponding to the direction from the position of the right operation lever 102a to the position of the left operation lever 102b (or the direction from the position of the left operation lever 102b to the position of the right operation lever 102a). In this case, the operator operates the right and left operation levers 102a and 102b so as to be aligned in a direction in which he/she wants to move the hull 100. This allows the hull 100 to move in that direction. Even operators with a poor marine vessel maneuvering skill can thus control the marine vessel easily.

Figure 25:
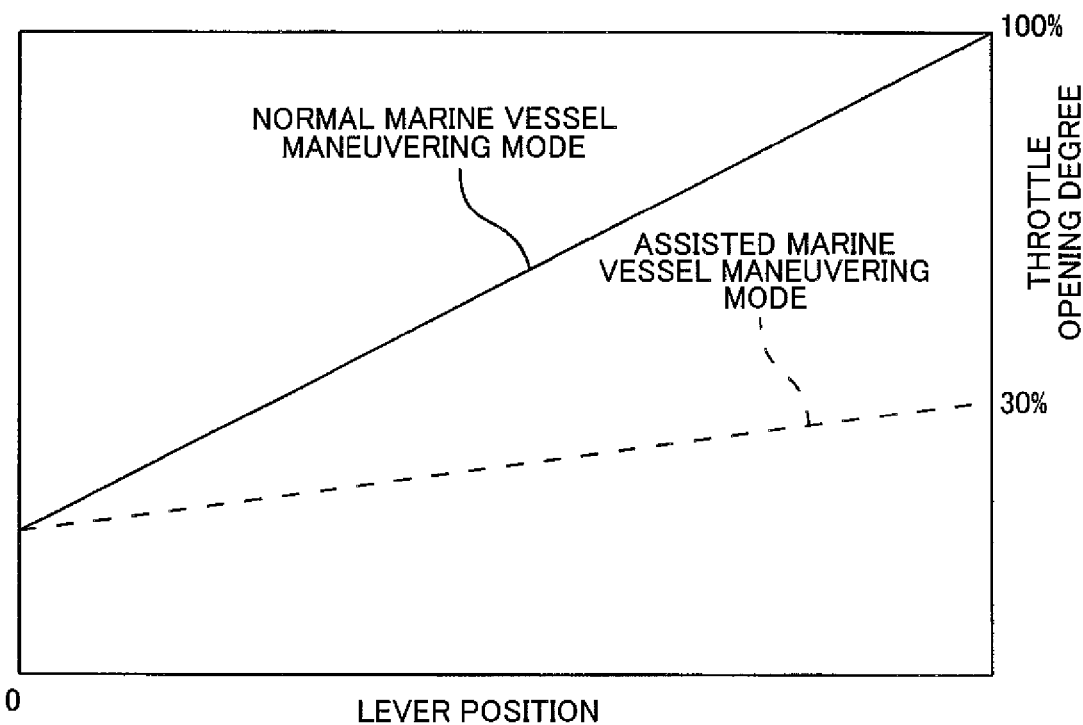
FIG. 25 shows throttle opening degree control when a marine vessel propulsion system according to an exemplary variation is in normal and assisted marine vessel maneuvering modes.

Although the second preferred embodiment above describes the case where the throttle opening degree is preferably controlled such that the relationship between the amount of displacement of each operation lever and the throttle opening degree in the assisted marine vessel maneuvering mode is the same as in the normal marine vessel maneuvering mode, the present invention is not restricted thereto. That is, in the assisted marine vessel maneuvering mode, the throttle opening degree may be controlled to be smaller than in the normal marine vessel maneuvering mode. As shown in FIG. 25, the throttle opening degree may be controlled such that the throttle opening degree at the maximum amount of displacement of each operation lever is approximately 30% of the maximum throttle opening degree in the normal marine vessel maneuvering mode, for example. Similarly, the throttle opening degree in the first preferred embodiment above may be controlled such that the throttle opening degree at the minimum displacement position Lmin in the assisted marine vessel maneuvering mode is smaller than that in the normal marine vessel maneuvering mode. Alternatively, in both the first and second preferred embodiments above, an upper limit may preliminarily be set on the engine speed, and in the assisted marine vessel maneuvering mode, the throttle opening degree may be controlled such that the engine speed does not exceed the upper limit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-014988 filed in the Japan Patent Office on Jan. 27, 2009, and the entire disclosure of the application is incorporated herein by reference.

What is claimed is:

1. A marine vessel propulsion system comprising:
    a plurality of propulsion devices arranged to be mounted on a hull so as to enable a steering angle to change;
    a plurality of operation levers arranged to be operated by a marine vessel maneuvering operator to control the plurality of propulsion devices to have respective shift states selected from among a forward drive state, a neutral state, and a reverse drive state;
    a plurality of lever position sensors provided to correspond to the plurality of respective operation levers and arranged to detect positions of the plurality of operation levers;
    a storage unit arranged to store therein behavior patterns of the hull preset to correspond to positional relationships between the plurality of operation levers; and
    a control unit programmed to select among the behavior patterns based on detection results from the plurality of lever position sensors, and to control the steering angles and shift states of the plurality of respective propulsion devices to correspond to the selected behavior pattern.

2. The marine vessel propulsion system according to claim 1, wherein
    the plurality of propulsion devices include a first propulsion device and a second propulsion device which is different from the first propulsion device;
    the plurality of operation levers include a first operation lever corresponding to the first propulsion device and a second operation lever corresponding to the second propulsion device; and
    the control unit is programmed to select among behavior patterns preset to correspond to the positional relationships between the first and second operation levers when a position of the first operation lever is different from a position of the second operation lever, and to control the steering angles and shift states of the respective first and second propulsion devices to correspond to the selected behavior pattern.

3. The marine vessel propulsion system according to claim 2, wherein
    the first and second operation levers are arranged laterally; and
    the control unit is programmed to control the steering angles, shift states, and propulsive forces of the respective first and second propulsion devices, when the position of the first operation lever is different from the position of the second operation lever, such that the hull moves in a direction corresponding to a direction from the position of the first operation lever to the position of the second operation lever.

4. The marine vessel propulsion system according to claim 3, wherein the control unit is programmed to control the steering angles, shift states, and propulsive forces of the respective first and second propulsion devices, when the first operation lever is in the neutral position and the second operation lever is in a position other than the neutral position, such that the hull moves in a direction corresponding to a direction from the position of the first operation lever in the neutral position to the position of the second operation lever in the position other than the neutral position.

5. The marine vessel propulsion system according to claim 1, further comprising:
    a steering operation mechanism arranged to be operated by the marine vessel maneuvering operator to change the steering angles of the plurality of respective propulsion devices;
    an operation angle sensor arranged to detect an operation angle of the steering operation mechanism; and
    a switching unit arranged to switch between normal marine vessel maneuvering control and assisted marine vessel maneuvering control; wherein
    in the normal marine vessel maneuvering control, the control unit is programmed to control the shift states and propulsive forces of the propulsion devices based on detection results from the plurality of lever position sensors, and to change the steering angles of the plurality of propulsion devices based on a detection result from the operation angle sensor; and
    in the assisted marine vessel maneuvering control, the control unit is programmed to select among behavior patterns corresponding to the positional relationships between the plurality of operation levers based on detection results from the plurality of lever position sensors, and to control the steering angles and shift states of the plurality of respective propulsion devices to correspond to the selected behavior pattern.

6. The marine vessel propulsion system according to claim 5, wherein in the assisted marine vessel maneuvering control, the control unit is programmed to control each of the propulsion devices to have a propulsive force smaller than that corresponding to the position of each operation lever in the normal marine vessel maneuvering control.

7. The marine vessel propulsion system according to claim 5, wherein in the assisted marine vessel maneuvering control, the control unit is programmed to select among behavior patterns preset to correspond to the positional relationships between the plurality of operation levers, based on detection results from the plurality of lever position sensors and independently of the relationship between the positions of the operation levers and the shift states of the propulsion devices in the normal marine vessel maneuvering control, and to control the steering angles and shift states of the plurality of respective propulsion devices to correspond to the selected behavior pattern.

8. The marine vessel propulsion system according to claim 1, wherein
- each of the propulsion devices includes an outboard motor arranged to be mounted on the hull so as to enable the steering angle to change;
- each of the outboard motors includes an engine with a driving force thereof being adjustable through control of a throttle opening degree, a propeller arranged to be rotated by a driving force from the engine, and a switching mechanism portion arranged to switch shift states;
- the operation levers are arranged to be operated by the marine vessel maneuvering operator to control the plurality of outboard motors to be their respective shift states and throttle opening degrees; and
- the control unit is programmed to select among the behavior patterns based on detection results from the plurality of lever position sensors, and to control the steering angles and shift states of the plurality of respective outboard motors to correspond to the selected behavior pattern.

9. A marine vessel comprising:
a hull; and
the marine vessel propulsion system according to claim 1 provided on the hull.

\* \* \* \* \*